(12) United States Patent
Gao et al.

(10) Patent No.: US 11,025,328 B2
(45) Date of Patent: Jun. 1, 2021

(54) TRANSMISSION BEAM DETERMINATION METHOD, TRANSMITTING END DEVICE AND RECEIVING END DEVICE

(71) Applicant: China Academy of Telecommunications Technology, Beijing (CN)

(72) Inventors: Qiubin Gao, Beijing (CN); Runhua Chen, Beijing (CN); Rakesh Tamrakar, Beijing (CN); Mengjun Wang, Beijing (CN); Xin Su, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/489,734

(22) PCT Filed: Feb. 24, 2018

(86) PCT No.: PCT/CN2018/077114
§ 371 (c)(1),
(2) Date: Aug. 29, 2019

(87) PCT Pub. No.: WO2018/166341
PCT Pub. Date: Sep. 20, 2018

(65) Prior Publication Data
US 2020/0014452 A1    Jan. 9, 2020

(30) Foreign Application Priority Data

Mar. 17, 2017  (CN) .......................... 201710160177.1

(51) Int. Cl.
*H04B 7/06* (2006.01)
*H04B 7/0408* (2017.01)
*H04B 7/08* (2006.01)

(52) U.S. Cl.
CPC ......... *H04B 7/0695* (2013.01); *H04B 7/0408* (2013.01); *H04B 7/0617* (2013.01); *H04B 7/088* (2013.01)

(58) Field of Classification Search
CPC .. H04B 7/0408; H04B 7/0617; H04B 7/0695; H04B 7/088
See application file for complete search history.

(56) References Cited

U.S. PATENT DOCUMENTS

| 2012/0162009 A1 | 6/2012 | Kim et al. |
| 2015/0257073 A1 | 9/2015 | Park et al. |

(Continued)

FOREIGN PATENT DOCUMENTS

| CN | 104521155 A | 4/2015 |
| CN | 104734754 A | 6/2015 |

(Continued)

OTHER PUBLICATIONS

Korean Intellectual Property Office, Notification of Reason for Refusal, Application No. 10-2019-7028707, Applicant: China Academy of Telecommunications Technology, Title of Invention: The Confirming Method of the Transmission Beam, and the Transmitting End and Reception End, dated May 28, 2020.

(Continued)

*Primary Examiner* — David B Lugo
(74) *Attorney, Agent, or Firm* — Flener IP & Business Law; Zareefa B. Flener

(57) ABSTRACT

The present disclosure provides a transmission beam determination method, a transmitting end device and a receiving end device. The transmission beam determination method includes: transmitting, by the transmitting end device, beam training signals for N number of transmission beams to the receiving end device; receiving, by the transmitting end device, identification information about Q number of trans- (Continued)

--- transmitting, by a transmitting end device, beam training signals for N number of transmission beams to a receiving end device — 201 receiving, by the transmitting end device, identification information about Q number of transmission beams in the N number of transmission beams and group information about each transmission beam in the Q number of transmission beams from the receiving end device — 202 determining, by the transmitting end device, that a signal is capable of being transmitted simultaneously to the receiving end device via transmission beams in the Q number of transmission beams belonging to different transmission beam groups — 203 mission beams in the N number of transmission beams and group information about each transmission beam in the Q number of transmission beams from the receiving end device, the Q number of transmission beams including G number of transmission beam groups, the G number of transmission beam groups being acquired by the receiving end device in accordance with a measurement result, the measurement result being a measurement result acquired after the receiving end device has received and measured the beam training signals from the transmitting end device; and determining, by the transmitting end device, that a signal is capable of being transmitted simultaneously to the receiving end device via transmission beams in the Q number of transmission beams belonging to different transmission beam groups.

18 Claims, 8 Drawing Sheets

(56) References Cited

U.S. PATENT DOCUMENTS

| | | | |
|---|---|---|---|
| 2016/0006122 | A1 | 1/2016 | Seol et al. |
| 2016/0197659 | A1 | 7/2016 | Yu et al. |
| 2016/0241322 | A1 | 8/2016 | Son et al. |
| 2017/0033851 | A1 | 2/2017 | Zhong et al. |
| 2017/0156067 | A1 | 6/2017 | Huang |
| 2018/0248601 | A1 | 8/2018 | Kishiyama et al. |
| 2019/0260452 | A1* | 8/2019 | Zhang .............. H04B 7/0695 |
| 2020/0014442 | A1* | 1/2020 | Tang .............. H04W 72/046 |
| 2020/0059290 | A1* | 2/2020 | Pan .............. H04B 7/0882 |
| 2020/0076491 | A1* | 3/2020 | Zhang .............. H04B 7/0628 |
| 2020/0128421 | A1* | 4/2020 | Yang .............. H04B 7/06 |

FOREIGN PATENT DOCUMENTS

| | | |
|---|---|---|
| CN | 104734758 A | 6/2015 |
| CN | 104734759 A | 6/2015 |
| CN | 105684321 A | 6/2016 |
| CN | 107734514 A | 2/2018 |
| WO | 2015020404 A1 | 2/2015 |
| WO | 2016027398 A1 | 2/2016 |
| WO | 2016148127 A1 | 9/2016 |

OTHER PUBLICATIONS

3GPP TSG-RAN WG1 #88; R1-1702675; Athens, Greece, Feb. 13-17, 2017; Ericsson; On group-based reporting of Tx beams; 8.1.2.2.1; Discussion and Decision.

European Patent Office, Munich, Germany, Communication, European Search Report, dated Jan. 21, 2020, PCT/CN2018077114, Applicant: China Academy of Telecommunications Technology.

3GPP TSG RAN WG1 Meeting #88, R1-1701800 Athens, Greece, Feb. 13-17, 2017, Source: ZTE, ZTE Microelectronics, Title: UE reporting for beam management, Agenda Item: 8.1.2.2.1, Document for: Discussion and Decision.

3GPP TSG-RAN WG1 #88 R1-1702675, Athens, Greece, Feb. 13-17, 2017, Source: Ericsson, Title: On group-based reporting of Tx beams, Agenda Item: 8.1.2.2.1, Document for: Discussion and Decision.

Partial Random Opportunistic Sdma With Beam Selection, Wang Hai-Yang, Liu Wei-Hua, vol. 49, No. 12, Dec. 2009, Telecommunication Engineering.

Fast Millimeter—Wave Beam Training with Receive Beamforming, Article in Journal of Communications and Networks • Oct. 2014 DOI: 10.1109/JCN.2014.000090, ResearchGate.

Patent Cooperation Treaty, International Preliminary Report on Patentability, PCT/CN2018/077114, Priority Date: Mar. 17, 2017, Applicant: China Academy of Telecommunications Technology, dated Sep. 17, 2019, Authorized Officer: Xiaofan Tang.

Notice of Reasons for Refusal, Application number: Japanese Patent Application No. 2019-548654, Date of Drafting: Reiwa 2 Nov. 25, 2020, 3055 5K00, Representative/Applicant: Patent business corporation Shin-Ei Patent Firm, Applied Provisions: The first item of Article 29, Article 29(2), Article 36.

3GPP TSG RAN1 NR ADHOC, R1-1700800, Jan 16-20, 2017, Spokane, U.S.A., Source: Qualcomm Incorporated, Title: Beam Management for NR, Agenda Item: 5.1.2.2, Document for: Discussion and Decision.

* cited by examiner

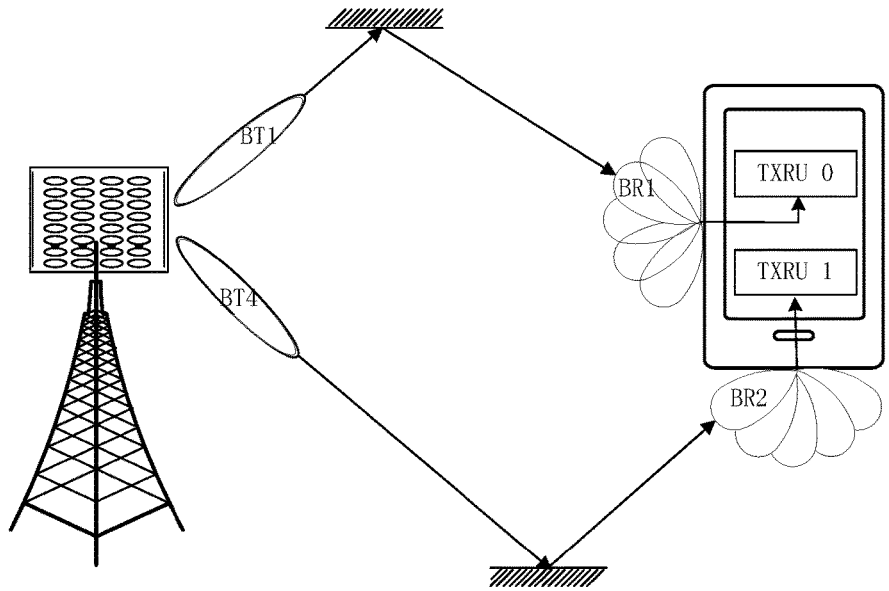

FIG. 4 receiving and measuring, by a receiving end device, beam training signals for N number of transmission beams from a transmitting end device, selecting Q number of transmission beams from the N number of transmission beams in accordance with a measurement result, and dividing the Q number of transmission beams into G number of transmission beam groups — 501 transmitting, by the receiving end device, identification information about the Q transmission beams and group information about each transmission beam in the Q transmission beams to the transmitting end device, to enable the transmitting end device to determine that a signal is capable of being transmitted simultaneously to the receiving end device via transmission beams in the Q transmission beams belonging to different transmission beam groups — 502

TRANSMISSION BEAM DETERMINATION METHOD, TRANSMITTING END DEVICE AND RECEIVING END DEVICE

CROSS-REFERENCE TO RELATED APPLICATION

The present application is the U.S. national phase of PCT Application No. PCT/CN2018/077114 filed on Feb. 24, 2018, which claims a priority of the Chinese patent application No. 201710160177.1 filed on Mar. 17, 2017, which are both incorporated herein by reference in their entirety.

TECHNICAL FIELD

The present disclosure relates to the field of communication technology, in particular to a transmission beam determination method, a transmitting end device and a receiving end device.

BACKGROUND

In a current communication system, a receiving end device, e.g., a User Equipment (UE), may include one or more transceiver units. No matter whether the receiving end device includes one transceiver unit or more than one transceiver unit, when signals are transmitted by a transmitting end device via a plurality of transmission beams, the receiving end device supports receiving the signals transmitted via parts or all of the transmission beams simultaneously. For example, when signals are transmitted by a base station to the UE via three transmission beams, the UE may receive the signals transmitted via one, two or three of the three transmission beams simultaneously. However, in the current communication system, it is impossible for the transmitting end device to determine the transmission beams via which the signals are transmitted simultaneously to the receiving end device, so there is such a situation where signals transmitted via some transmission beams are not received by the receiving end device, resulting in a waste of transmission resources. Hence, there is an urgent need to determine the transmission beams via which the signals are capable of being transmitted simultaneously by the transmitting end device to the receiving end device.

SUMMARY

An object of the present disclosure is to provide a transmission beam determination method, a transmitting end device and a receiving end device, so as to determine the transmission beams via which the signals are capable of being transmitted simultaneously by the transmitting end device to the receiving end device.

In one aspect, the present disclosure provides in some embodiments a transmission beams determination method, including: transmitting, by a transmitting end device, beam training signals for N number of transmission beams to a receiving end device, N being a positive integer; receiving, by the transmitting end device, identification information about Q number of transmission beams in the N number of transmission beams and group information about each transmission beam in the Q number of transmission beams from the receiving end device, the Q number of transmission beams including G number of transmission beam groups, the G number of transmission beam groups being acquired by the receiving end device in accordance with a measurement result, the measurement result being a measurement result acquired after the receiving end device has received and measured the beam training signals from the transmitting end device, Q and G being each a positive integer; and determining, by the transmitting end device, that a signal is capable of being transmitted simultaneously to the receiving end device via transmission beams in the Q number of transmission beams belonging to different transmission beam groups.

In some possible embodiments of the present disclosure, the G number of transmission beam groups correspond to G number of transceiver unit groups of the receiving end device respectively.

In some possible embodiments of the present disclosure, the measurement results include measurement results of the G number of transceiver unit groups acquired after the receiving end device has received and measured the beam training signal for each transmission beam in the N number of transmission beams using the G number of transceiver unit groups, and the measurement result of each transceiver unit group includes a measurement result acquired after the receiving end device has received and measured the beam training signals for the N number of transmission beams using the transceiver unit group. The Q number of transmission beams include Q number of transmission beams selected by the receiving end device from the N number of transmission beams in accordance with the measurement results of the G number of transceiver unit groups. The G number of transmission beam groups include G number of transmission beam groups acquired by the receiving end device after dividing the Q number of transmission beams in accordance with the measurement results of the G number of transceiver unit groups.

In some possible embodiments of the present disclosure, the Q number of transmission beams include Q number of transmission beams selected by the receiving end device in the N number of transmission beams and corresponding to Q number of measurement results with top Q reception quality levels in the measurement results of the G number of transceiver unit groups. The G number of transmission beam groups include G number of transmission beam groups acquired by the receiving end device after dividing the Q number of transmission beams in accordance with the transceiver unit groups of the Q number of transmission beams corresponding to the Q number of measurement results.

In some possible embodiments of the present disclosure, the Q number of transmission beams include Q number of transmission beams selected by the receiving end device in the N number of transmission beams and corresponding to Q number of measurement results acquired in accordance with $Q_g$ measurement results with top $Q_g$ reception quality levels in the measurement results of each transceiver unit group, where $Q_g$s for different transceiver unit groups are a same positive integer or different positive integers, and a sum of $Q_g$s corresponding to the G number of transmission beam groups is Q. The G number of transmission beam groups include G number of transmission beam groups acquired by the receiving end device after dividing the $Q_g$ transmission beams corresponding to the $Q_g$ measurement results of each transceiver unit group into a transmission beam group corresponding to the transceiver unit group.

In some possible embodiments of the present disclosure, each transceiver unit group of the receiving end device includes at least one transceiver unit, and each transceiver unit includes at least one reception beam. The measurement results of the G number of transceiver unit groups include measurement results of the G number of transceiver unit groups selected from measurement result sets of the G number of transceiver unit groups acquired by the receiving end device after receiving and measuring the beam training signal for each transmission beam in the N number of transmission beams using each reception beam for the G number of transceiver unit groups. The measurement result set of each transceiver unit group include measurement results acquired by the receiving end device after receiving and measuring the beam training signals for the N number of transmission beams using each reception beam for the transceiver unit group. The measurement results of each transceiver unit group include N measurement results, and the N measurement results include measurement results with best reception quality levels corresponding to each transmission beam in the measurement result sets of the transceiver unit group.

In some possible embodiments of the present disclosure, the receiving, by the transmitting end device, the identification information about the Q number of transmission beams in the N number of transmission beams and the group information about each transmission beam in the Q number of transmission beams from the receiving end device includes receiving, by the transmitting end device, the identification information about the Q number of transmission beams in the N number of transmission beams as well as the group information and subgroup information about each transmission beam in the Q number of transmission beams from the receiving end device, and the transmission beams corresponding to a same reception beam in each transmission beam group belong to one transmission beam subgroup. The transmission beam determination method further includes determining, by the transmitting end device, that a signal is capable of being transmitted simultaneously to the receiving end device via the transmission beams belonging to a same transmission beam subgroup in the Q number of transmission beams.

In some possible embodiments of the present disclosure, the reception beam corresponding to each transmission beam includes a reception beam corresponding to a measurement result with the best reception quality level acquired by the receiving end device in the measurement results of the beam training signal for the transmission beam using all candidate reception beams.

In some possible embodiments of the present disclosure, the receiving, by the transmitting end device, the identification information about the Q number of transmission beams in the N number of transmission beams as well as the group information and the subgroup information about each transmission beam in the Q number of transmission beams from the receiving end device includes: receiving, by the transmitting end device, group information about the G number of transmission beam groups from the receiving end device, the group information about each transmission beam group including transmission beam subgroup information about each transmission beam subgroup in the transmission beam group, and the transmission beam subgroup information including identification information about each transmission beam in the transmission beam subgroup; or receiving, by the transmitting end device, beam division information about the Q number of transmission beams from the receiving end device, the beam division information about each transmission beam including identification information about the transmission beam, a group identity (ID) of the transmission beam group to which the transmission beam belongs, and a subgroup ID of the transmission beam subgroup to which the transmission beam belongs.

In some possible embodiments of the present disclosure, when the G number of transmission beam groups include a target transmission beam group, the target transmission beam group includes a target transmission beam. A reception beam corresponding to the target transmission beam is different from a reception beam corresponding to any of the other transmission beams in the target transmission beam group, and a subgroup ID of the target transmission beam is null or the target transmission beam has a predetermined subgroup ID.

In another aspect, the present disclosure provides in some embodiments a transmission beam determination method, including: receiving and measuring, by a receiving end device, beam training signals for N number of transmission beams from a transmitting end device, selecting Q number of transmission beams from the N number of transmission beams in accordance with a measurement result, and dividing the Q number of transmission beams into G number of transmission beam groups, N, Q and G being each a positive integer; and transmitting, by the receiving end device, identification information about the Q number of transmission beams and group information about each transmission beam in the Q number of transmission beams to the transmitting end device, so as to enable the transmitting end device to determine that a signal is capable of being transmitted simultaneously to the receiving end device via transmission beams in the Q number of transmission beams belonging to different transmission beam groups.

In some possible embodiments of the present disclosure, the receiving and measuring, by the receiving end device, the beam training signals for the N number of transmission beams from the transmitting end device includes receiving and measuring, by the receiving end device, the beam training signals for the N number of transmission beams from the transmitting end device using G number of transceiver unit groups, and the G number of transmission beam groups correspond to G number of transceiver unit groups of the receiving end device respectively.

In some possible embodiments of the present disclosure, the receiving and measuring, by the receiving end device, the beam training signals for the N number of transmission beams from the transmitting end device, selecting the Q number of transmission beams from the N number of transmission beams in accordance with the measurement result, and dividing the Q number of transmission beams into the G number of transmission beam groups includes: receiving and measuring, by the receiving end device, the beam training signal for each transmission beam in the N number of transmission beams from the transmitting end device using the G number of transceiver unit groups to acquire measurement results of the G number of transceiver unit groups, the measurement result of each transceiver unit group including a measurement result acquired after the receiving end device has received and measured the beam training signals for the N number of transmission beams using the transceiver unit group; and selecting, by the receiving end device, the Q number of transmission beams from the N number of transmission beams in accordance with the measurement results of the G number of transceiver unit groups, and dividing the Q number of transmission beams into the G number of transmission beam groups.

In some possible embodiments of the present disclosure, the selecting, by the receiving end device, the Q number of transmission beams from the N number of transmission beams in accordance with the measurement results of the G number of transceiver unit groups, and dividing the Q number of transmission beams into the G number of transmission beam groups includes selecting, by the receiving end device, Q number of measurement results with top Q reception quality levels in the measurement results of the G number of transceiver unit groups, selecting the Q number of transmission beams corresponding to the Q number of measurement results in the N number of transmission beams, and dividing the Q number of transmission beams into the G number of transmission beam groups in accordance with the transceiver unit groups of the Q number of transmission beams corresponding to the Q number of measurement results.

In some possible embodiments of the present disclosure, the selecting, by the receiving end device, the Q number of transmission beams from the N number of transmission beams in accordance with the measurement results of the G number of transceiver unit groups and dividing the Q number of transmission beams into the G number of transmission beam groups includes: selecting, by the receiving end device, Qg measurement results with top Qg reception quality levels in the measurement results of each transceiver unit group to acquire Q number of measurement results, $Q_g$s for different transceiver unit groups being a same positive integer or different positive integers, and a sum of $Q_g$s corresponding to the G number of transmission beam groups being Q; and selecting, by the receiving end device, the Q number of transmission beams corresponding to the Q number of measurement results from the N number of transmission beams, and dividing the $Q_g$ transmission beams corresponding to the $Q_g$ measurement results of each transceiver unit group into a transmission beam group corresponding to the transceiver unit group.

In some possible embodiments of the present disclosure, each transceiver unit group of the receiving end device includes at least one transceiver unit, and each transceiver unit includes at least one reception beam. The receiving and measuring, by the receiving end device, the beam training signal for each transmission beam of the N number of transmission beams from the transmission end using the G number of transceiver unit groups to acquire the measurement results of the G number of transceiver unit groups includes: receiving and measuring, by the receiving end device, the beam training signal for each transmission beam of the N number of transmission beams from the transmitting end device using each reception beam for the G number of transceiver unit group to acquire measurement result sets of the G number of transceiver unit groups, the measurement result set of each transceiver unit group including measurement results acquired by the receiving end device after receiving and measuring the beam training signals for the N number of transmission beams using each reception beam for the transceiver unit group; and selecting, by the receiving end device, the measurement results of the G number of transceiver unit groups from the measurement result set of the G number of transceiver unit groups, the measurement results of each transceiver unit group including N measurement results, and the N measurement results including measurement results with best reception quality levels corresponding to each transmission beam in the measurement result sets of the transceiver unit group.

In some possible embodiments of the present disclosure, the transmission beam determination method further includes: selecting, by the receiving end device, one reception beam for each of the Q number of transmission beams from candidate reception beams for the receiving end device; and dividing, by the receiving end device, transmission beams in each transmission beam group corresponding to a same reception beam into one transmission beam subgroup. The transmitting, by the receiving end device, the identification information about the Q number of transmission beams in the N number of transmission beams and the subgroup information about each transmission beam in the Q number of transmission beams to the transmitting end device includes transmitting, by the receiving end device, the identification information about the Q number of transmission beams in the N number of transmission beams as well as the group information and subgroup information about each transmission beam in the Q number of transmission beams to the transmitting end device.

In some possible embodiments of the present disclosure, the selecting, by the receiving end device, one reception beam for each of the Q number of transmission beams in the candidate reception beams for the receiving end device includes acquiring, by the receiving end device, measurement results of the beam training signal for each transmission beam using all the candidate reception beams for the receiving end device, and selecting a reception beam corresponding to a measurement result with a best reception quality level in the acquired measurement results as the reception beam for the transmission beam.

In some possible embodiments of the present disclosure, the transmitting, by the transmitting end device, the identification information about the Q number of transmission beams in the N number of transmission beams as well as the group information and subgroup information about each transmission beam in the Q number of transmission beams to the transmitting end device includes: transmitting, by the receiving end device, group information about the G number of transmission beam groups to the transmitting end device, the group information about each transmission beam group including transmission beam subgroup information about each transmission beam subgroup in the transmission beam group, and the transmission beam subgroup information including the identification information about each transmission beam in the transmission beam subgroup; or transmitting, by the receiving end device, beam division information about the Q number of transmission beams to the transmitting end device, the beam division information about each transmission beam including identification information about the transmission beam, a group ID of the transmission beam group to which the transmission beam belongs, and a subgroup ID of the transmission beam subgroup to which the transmission beam belongs.

In some possible embodiments of the present disclosure, when the G number of transmission beam groups include a target transmission beam group, the target transmission beam group includes a target transmission beam. A reception beam corresponding to the target transmission beam is different from a reception beam corresponding to any of the other transmission beams in the target transmission beam group, and a subgroup ID of the target transmission beam is null or the target transmission beam has a predetermined subgroup ID.

In yet another aspect, the present disclosure provides in some embodiments a transmitting end device, including: a transmission module configured to transmit beam training signals for N number of transmission beams to a receiving end device, N being a positive integer; a reception module configured to receive identification information about Q number of transmission beams in the N number of transmission beams and group information about each transmission beam in the Q number of transmission beams from the receiving end device, the Q number of transmission beams including G number of transmission beam groups, the G number of transmission beam groups being acquired by the receiving end device in accordance with a measurement result, the measurement result being a measurement result acquired after the receiving end device has received and measured the beam training signals from the transmitting end device, Q and G being each a positive integer; and a first determination module configured to determine that a signal is capable of being transmitted simultaneously to the receiving end device via transmission beams in the Q number of transmission beams belonging to different transmission beam groups.

In some possible embodiments of the present disclosure, the G number of transmission beam groups correspond to G number of transceiver unit groups of the receiving end device respectively.

In some possible embodiments of the present disclosure, the measurement results include measurement results of the G number of transceiver unit groups acquired after the receiving end device has received and measured the beam training signal for each transmission beam in the N number of transmission beams using the G number of transceiver unit groups, and the measurement result of each transceiver unit group includes a measurement result acquired after the receiving end device has received and measured the beam training signals for the N number of transmission beams using the transceiver unit group. The Q number of transmission beams include Q number of transmission beams selected by the receiving end device from the N number of transmission beams in accordance with the measurement results of the G number of transceiver unit groups. The G number of transmission beam groups include G number of transmission beam groups acquired by the receiving end device after dividing the Q number of transmission beams in accordance with the measurement results of the G number of transceiver unit groups.

In some possible embodiments of the present disclosure, the Q number of transmission beams include Q number of transmission beams selected by the receiving end device in the N number of transmission beams and corresponding to Q number of measurement results with top Q reception quality levels in the measurement results of the G number of transceiver unit groups. The G number of transmission beam groups include G number of transmission beam groups acquired by the receiving end device after dividing the Q number of transmission beams in accordance with the transceiver unit groups of the Q number of transmission beams corresponding to the Q number of measurement results.

In some possible embodiments of the present disclosure, the Q number of transmission beams include Q number of transmission beams selected by the receiving end device in the N number of transmission beams and corresponding to Q number of measurement results acquired in accordance with $Q_g$ measurement results with top $Q_g$ reception quality levels in the measurement results of each transceiver unit group, where $Q_g$s for different transceiver unit groups are a same positive integer or different positive integers, and a sum of $Q_g$s corresponding to the G number of transmission beam groups is Q. The G number of transmission beam groups include G number of transmission beam groups acquired by the receiving end device after dividing the $Q_g$ transmission beams corresponding to the $Q_g$ measurement results of each transceiver unit group into a transmission beam group corresponding to the transceiver unit group.

In some possible embodiments of the present disclosure, each transceiver unit group of the receiving end device includes at least one transceiver unit, and each transceiver unit includes at least one reception beam. The measurement results of the G number of transceiver unit groups include measurement results of the G number of transceiver unit groups selected from measurement result sets of the G number of transceiver unit groups acquired by the receiving end device after receiving and measuring the beam training signal for each transmission beam in the N number of transmission beams using each reception beam for the G number of transceiver unit groups. The measurement result set of each transceiver unit group include measurement results acquired by the receiving end device after receiving and measuring the beam training signals for the N number of transmission beams using each reception beam for the transceiver unit group. The measurement results of each transceiver unit group include N measurement results, and the N measurement results include measurement results with best reception quality levels corresponding to each transmission beam in the measurement result sets of the transceiver unit group.

In some possible embodiments of the present disclosure, the reception module is further configured to receive the identification information about the Q number of transmission beams in the N number of transmission beams as well as the group information and subgroup information about each transmission beam in the Q number of transmission beams from the receiving end device, and the transmission beams corresponding to a same reception beam in each transmission beam group belong to one transmission beam subgroup. The transmitting end device further includes a second determination module configured to determine that a signal is capable of being transmitted simultaneously to the receiving end device via the transmission beams belonging to a same transmission beam subgroup in the Q number of transmission beams.

In some possible embodiments of the present disclosure, the reception beam corresponding to each transmission beam includes a reception beam corresponding to a measurement result with the best reception quality level acquired by the receiving end device in the measurement results of the beam training signal for the transmission beam using all candidate reception beams.

In some possible embodiments of the present disclosure, the reception module is further configured to: receive group information about the G number of transmission beam groups from the receiving end device, the group information about each transmission beam group including transmission beam subgroup information about each transmission beam subgroup in the transmission beam group, and the transmission beam subgroup information including identification information about each transmission beam in the transmission beam subgroup; or receive beam division information about the Q number of transmission beams from the receiving end device, the beam division information about each transmission beam including identification information about the transmission beam, a group ID of the transmission beam group to which the transmission beam belongs, and a subgroup ID of the transmission beam subgroup to which the transmission beam belongs.

In some possible embodiments of the present disclosure, when the G number of transmission beam groups include a target transmission beam group, the target transmission beam group includes a target transmission beam. A reception beam corresponding to the target transmission beam is different from a reception beam corresponding to any of the other transmission beams in the target transmission beam group, and a subgroup ID of the target transmission beam is null or the target transmission beam has a predetermined subgroup ID.

In still yet another aspect, the present disclosure provides in some embodiments a receiving end device, including: a measurement module configured to receive and measure beam training signals for N number of transmission beams from a transmitting end device, select Q number of transmission beams from the N number of transmission beams in accordance with a measurement result, and divide the Q number of transmission beams into G number of transmission beam groups, N, Q and G being each a positive integer; and a transmission module configured to transmit identification information about the Q number of transmission beams and group information about each transmission beam in the Q number of transmission beams to the transmitting end device, so as to enable the transmitting end device to determine that a signal is capable of being transmitted simultaneously to the receiving end device via transmission beams in the Q number of transmission beams belonging to different transmission beam groups.

In some possible embodiments of the present disclosure, the measurement module is configured to receive and measure the beam training signals for the N number of transmission beams from the transmitting end device using G number of transceiver unit groups, and the G number of transmission beam groups correspond to G number of transceiver unit groups of the receiving end device respectively.

In some possible embodiments of the present disclosure, the measurement module includes: a measurement unit configured to receive and measure the beam training signal for each transmission beam in the N number of transmission beams from the transmitting end device using the G number of transceiver unit groups to acquire measurement results of the G number of transceiver unit groups, the measurement result of each transceiver unit group including a measurement result acquired after the receiving end device has received and measured the beam training signals for the N number of transmission beams using the transceiver unit group; and a selection unit configured to select the Q number of transmission beams from the N number of transmission beams in accordance with the measurement results of the G number of transceiver unit groups, and divide the Q number of transmission beams into the G number of transmission beam groups.

In some possible embodiments of the present disclosure, the selection unit is further configured to select Q number of measurement results with top Q reception quality levels in the measurement results of the G number of transceiver unit groups, select the Q number of transmission beams corresponding to the Q number of measurement results in the N number of transmission beams, and divide the Q number of transmission beams into the G number of transmission beam groups in accordance with the transceiver unit groups of the Q number of transmission beams corresponding to the Q number of measurement results.

In some possible embodiments of the present disclosure, the selection unit includes: a first selection sub-unit configured to select $Q_g$ measurement results with top $Q_g$ reception quality levels in the measurement results of each transceiver unit group to acquire Q number of measurement results, $Q_g$s for different transceiver unit groups being a same positive integer or different positive integers, and a sum of $Q_g$s corresponding to the G number of transmission beam groups being Q; and a second selection sub-unit configured to select the Q number of transmission beams corresponding to the Q number of measurement results from the N number of transmission beams, and divide the $Q_g$ transmission beams corresponding to the $Q_g$ measurement results of each transceiver unit group into a transmission beam group corresponding to the transceiver unit group.

In some possible embodiments of the present disclosure, each transceiver unit group of the receiving end device includes at least one transceiver unit, and each transceiver unit includes at least one reception beam. The measurement unit includes: a measurement sub-unit configured to receive and measure the beam training signal for each transmission beam of the N number of transmission beams from the transmitting end device using each reception beam for the G number of transceiver unit group to acquire measurement result sets of the G number of transceiver unit groups, the measurement result set of each transceiver unit group including measurement results acquired by the receiving end device after receiving and measuring the beam training signals for the N number of transmission beams using each reception beam for the transceiver unit group; and a third selection sub-unit configured to select the measurement results of the G number of transceiver unit groups from the measurement result set of the G number of transceiver unit groups, the measurement results of each transceiver unit group including N measurement results, and the N measurement results including measurement results with best reception quality levels corresponding to each transmission beam in the measurement result sets of the transceiver unit group.

In some possible embodiments of the present disclosure, the receiving end device further includes: a selection module configured to select one reception beam for each of the Q number of transmission beams from candidate reception beams for the receiving end device; and a division module configured to divide transmission beams in each transmission beam group corresponding to a same reception beam into one transmission beam subgroup. The transmission module is further configured to transmit the identification information about the Q number of transmission beams in the N number of transmission beams as well as the group information and subgroup information about each transmission beam in the Q number of transmission beams to the transmitting end device.

In some possible embodiments of the present disclosure, the selection module is further configured to acquire measurement results of the beam training signal for each transmission beam using all the candidate reception beams for the receiving end device, and select a reception beam corresponding to a measurement result with a best reception quality level in the acquired measurement results as the reception beam for the transmission beam.

In some possible embodiments of the present disclosure, the transmission module is further configured to: transmit group information about the G number of transmission beam groups to the transmitting end device, the group information about each transmission beam group including transmission beam subgroup information about each transmission beam subgroup in the transmission beam group, and the transmission beam subgroup information including the identification information about each transmission beam in the transmission beam subgroup; or transmit beam division information about the Q number of transmission beams to the transmitting end device, the beam division information about each transmission beam including identification information about the transmission beam, a group ID of the transmission beam group to which the transmission beam belongs, and a subgroup ID of the transmission beam subgroup to which the transmission beam belongs.

In some possible embodiments of the present disclosure, when the G number of transmission beam groups include a target transmission beam group, the target transmission beam group includes a target transmission beam. A reception beam corresponding to the target transmission beam is different from a reception beam corresponding to any of the other transmission beams in the target transmission beam group, and a subgroup ID of the target transmission beam is null or the target transmission beam has a predetermined subgroup ID.

In still yet another aspect, the present disclosure provides in some embodiments a transmitting end device, including a processor, a transceiver, a memory, a user interface and a bus interface. The processor is configured to read a program stored in the memory, so as to implement the above-mentioned transmission beam determination method at the transmitting end device.

In still yet another aspect, the present disclosure provides in some embodiments a receiving end device, including a processor, a transceiver, a memory, a user interface and a bus interface. The processor is configured to read a program stored in the memory, so as to implement the above-mentioned transmission beam determination method at the receiving end device.

In still yet another aspect, the present disclosure provides in some embodiments a computer-readable storage medium storing therein a computer program. The computer program is executed by a processor so as to implement the above-mentioned transmission beam determination method.

The present disclosure at least has the following beneficial effects. In the embodiments of the present disclosure, the transmitting end device may transmit the beam training signals for the N number of transmission beams to the receiving end device, where N is a positive integer. Next, the transmitting end device may receive the identification information about the Q number of transmission beams in the N number of transmission beams and the group information about each transmission beam in the Q number of transmission beams from the receiving end device. The Q number of transmission beams may include the G number of transmission beam groups, and the G number of transmission beam groups may be divided by the receiving end device in accordance with the measurement results, the measurement results may be measurement results acquired by the receiving end device after receiving and measuring the beam training signals from the transmitting end device, and Q and G are each a positive integer. Then, the transmitting end device may determine that the signal is capable of transmitting simultaneously to the receiving end device via the transmission beams in the Q number of transmission beams belonging to different transmission beam groups. As a result, it is able for the transmitting end device to determine the transmission beams via which the signal is transmitted to the receiving end device simultaneously.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 4 is another schematic view showing the transmission of the signal according to some embodiments of the present disclosure;

FIG. 5 is a flow chart of a transmission beam determination method according to some embodiments of the present disclosure;

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
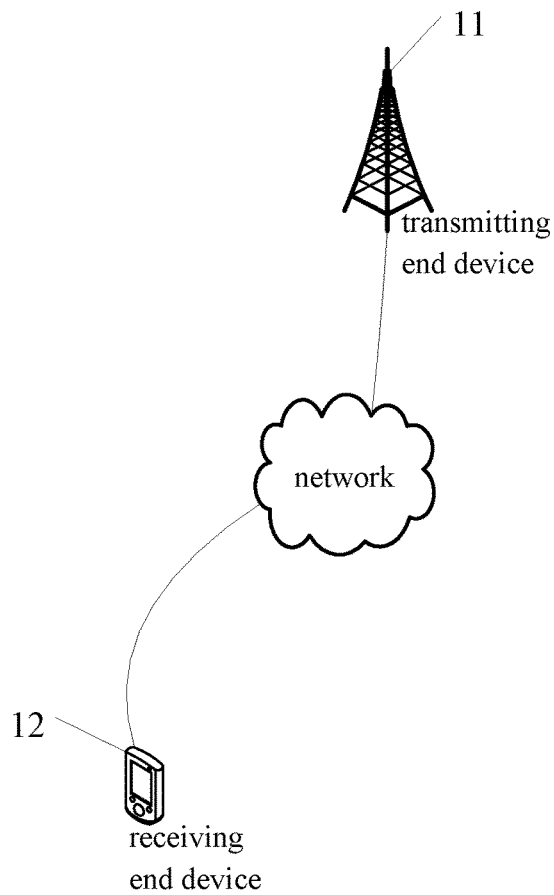
FIG. 1 is a schematic view showing an available network according to some embodiments of the present disclosure.

FIG. 1 shows a network to which the scheme in the embodiments of the present disclosure is applicable. As shown in FIG. 1, the network includes a transmitting end device 11 and a receiving end device 12. The transmitting end device 11 may be a base station or a terminal device, and the receiving end device 12 may also be a terminal device or a base station. For example, the transmitting end device 11 may be a base station, and the receiving end device 12 may be a terminal device, so communication may be achieved between the terminal and the base station. For another example, the transmitting end device 11 may be a terminal device, and the receiving end device 12 may be a base station, so communication may also be achieved between the terminal and the base station. For yet another example, the transmitting end device 11 may be a base station, and the receiving end device 12 may be a base station too, so communication may also be achieved between the base stations. For still yet another example, the transmitting end device 11 may be a terminal, and the receiving end device 12 may be a terminal too, so communication may also be achieved between the terminals. Of course, in the embodiments of the present disclosure, the transmitting end device 11 may not be limited to the terminal or base station, e.g., it may also be any other network side device. Identically, the receiving end device 12 may not be limited to the terminal device or base station, e.g., it may also be any other network side device. In FIG. 1, the transmitting end device 11 is the base station and the receiving end device 12 is the terminal device. The terminal device may be a User Equipment (UE), e.g., a mobile phone, a tablet personal computer, a laptop computer, a Personal Digital Assistant (PDA), a Mobile Internet Device (MID) or a wearable device. It should be appreciated that, the types of the terminal will not be particularly defined herein. The base station may be a micro base station (e.g., Long Term Evolution (LTE) evolved Node B (eNB), or $5^{th}$-Generation (5G) New Radio (NR) NB), or a micro base station (e.g., a Low Power Node (LPN) pico base station, or a femto base station), or an Access Point (AP). In addition, the base station may also be a network node consisting of a Central Unit (CU) and a plurality of Transmission Reception Points (TRPs) managed and controlled by the CU. In addition, one or more cells (e.g., different frequency points or sectors) may be covered by one base station. It should be appreciated that, the types of the base station will not be particularly defined herein.

Figure 2:
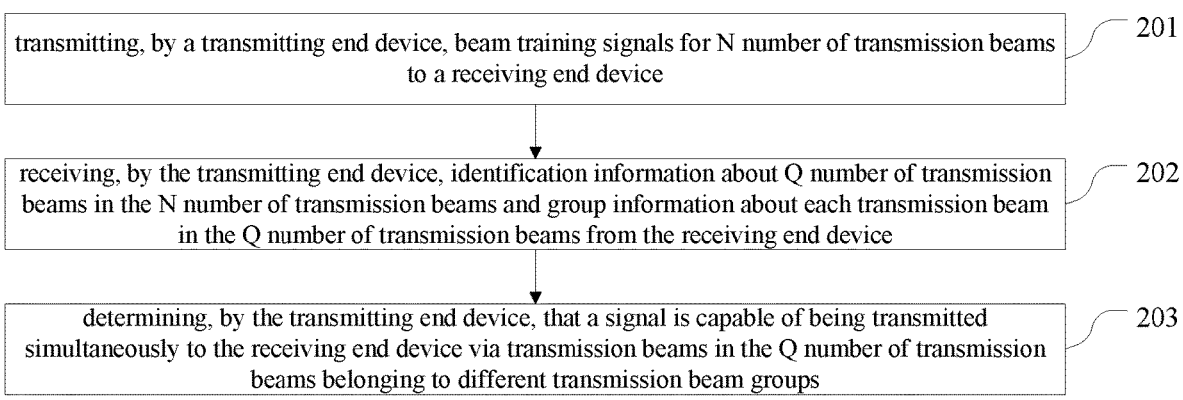
FIG. 2 is a flow chart of a transmission beam determination method according to some embodiments of the present disclosure.

The present disclosure provides in some embodiments a transmission beam determination method which, as shown in FIG. 2, includes: Step 201 of transmitting, by a transmitting end device, beam training signals for N number of transmission beams to a receiving end device, N being a positive integer; Step 202 of receiving, by the transmitting end device, identification information about Q number of transmission beams in the N number of transmission beams and group information about each transmission beam in the Q number of transmission beams from the receiving end device, the Q number of transmission beams including G number of transmission beam groups, the G number of transmission beam groups being acquired by the receiving end device in accordance with a measurement result, the measurement result being a measurement result acquired after the receiving end device has received and measured the beam training signals from the transmitting end device, Q and G being each a positive integer; and Step 203 of determining, by the transmitting end device, that a signal is capable of being transmitted simultaneously to the receiving end device via transmission beams in the Q number of transmission beams belonging to different transmission beam groups.

In the embodiments of the present disclosure, the N number of transmission beams may be all or parts of the transmission beams for the transmitting end device. For example, there may exist $N_T^{BS}$ candidate transmission beams for the transmitting end device, each transmission beam may correspond to one group of beamforming weight values, and beamforming weight values corresponding to an $n^{th}$ transmission beam may be expressed as $W_n = [w_1^n \ w_2^n \ \ldots \ w_K^n]^T$, where K represents the quantity of antenna units for beamforming and it may be smaller than the quantity of antenna units of the transmitting end device, e.g., one transmission beam may be transmitted via K number of antenna units connected to a transceiver unit. $N_T^{BS}$ may be equal to or greater than N. When the transmitting end device is a base station, the transmission beam may be a downlink transmission beam, and when the transmitting end device is a terminal, the transmission beam may be an uplink transmission beam.

For the beam training signals for the N number of transmission beams, one beam training signal may be transmitted by the transmitting end device for each transmission beam. For example, for $N_T^{BS}$ downlink transmission beams, the base station may transmit $N_T^{BS}$ beam training signals. In addition, the beam training signals for the N number of transmission beams may be transmitted in a Time Division Multiplexing (TDM) manner, a Frequency Division Multiplexing (FDM) manner, a Code Division Multiplexing (CDM) manner, or a combination thereof, which will not be particularly defined herein. For example, in an Orthogonal Frequency Division Multiplexing (OFDM)-based system, $N_T^{BS}$ training signals may occupy $N_T^{BS}$ OFDM symbols, each training signal may occupy one OFDM symbol, and the training signals may be transmitted in a TDM manner. In addition, the training signals for a plurality of beams may be transmitted via one OFDM symbol, and these training signals may be transmitted in an FDM manner or a CDM manner.

In addition, the beam training signals for the N number of transmission beams may be transmitted after being beamformed with the beamforming weight value corresponding to each transmission beam. In Step 201, the beam training signals may be transmitted periodically or non-periodically.

Subsequent to the transmission of the beam training signals by the transmitting end device, the receiving end device may receive and measure the beam training signals from the transmitting end device. For example, the receiving end device may receive and measure the beam training signals for the N number of transmission beams from the transmitting end device, select the Q number of transmission beams from the N number of transmission beams in accordance with measurement results, and divide the Q number of transmission beams into the G number of transmission beam groups, where Q and G are each a positive integer.

The receiving end device may receive and measure the beam training signals for the N number of transmission beams using all or parts of transceiver units of the receiving end device. For example, the receiving end device may receive and measure the beam training signal for each transmission beam in the N number of transmission beams using all or parts of the transceiver units, so as to acquire the measurement results. Each measurement result may include a measurement result of the beam training signal for each transmission beam acquiring using a corresponding transceiver unit. In addition, the receiving end device may receive and measure the beam training signals for the N number of transmission beams using all or parts of the transceiver units, so as to acquire the measurement results. Each measurement result may include a measurement result of the beam training signal for one or more transmission beams acquired using a corresponding transceiver unit.

The Q number of transmission beams may include transmission beams corresponding to the measurement results with top Q reception quality levels in the measurement results acquired after the receiving and measuring operation, or may include Q number of transmission beams corresponding to a certain quantity of measurement results selected from the measurement results. It should be appreciated that, the receiving end device may receive and measure the beam training signal for the same transmission beam using a same transceiver unit, and when the measurement results have excellent reception quality levels, the same transmission beam may be selected with respect to the measurement results of different transceiver units, i.e., the Q number of transmission beams may include the same beams. For example, the beam training signal for the transmission beam a may be received and measured using a transceiver unit a and a transceiver unit b, and the measurement results of the beam training signal for the transmission beam a acquired using the transceiver unit a and the transceiver unit b may have the best reception quality levels among all the measurement results acquired using the transceiver unit a and the transceiver unit b, so the transmission beam a may be selected for both the transceiver unit a and the transceiver unit b.

In addition, the Q number of transmission beams are divided in accordance with the measurement results, so one transmission beam may inevitably correspond to a specific transceiver unit or a specific transceiver unit group. Hence, it is able to divide the transmission beams corresponding to the same transceiver unit or the same transceiver unit group into a same transmission beam group, i.e., one transmission beam group may correspond to the same transceiver unit or the same transceiver unit group. In addition, the receiving end device may divide the transmission beams to be received simultaneously into one transmission beam group.

Hence, after selecting the Q number of transmission beams and dividing the G number of transmission beam groups, the receiving end device may transmit the identification information about the Q number of transmission beams and the group information about each transmission beam in the Q number of transmission beams to the transmitting end device. Upon the receipt of the identification information and the group information, the transmitting end device may know the transmission beam group to which each transmission beam belongs, and then determine that the signal is capable of being transmitted simultaneously to the receiving end device via the transmission beams in the Q number of transmission beams belonging to different transmission groups. The transmission beams via which the signal is capable of being transmitted simultaneously to the receiving end device may include transmission beams via which the signal is capable of being transmitted to the receiving end device and received by the receiving end device simultaneously. In addition, in the embodiments of the present disclosure, the word "simultaneously" may be understood as that the signal is capable of being transmitted and received at a same time point (e.g., via a same OFDM symbol).

In addition, in the embodiments of the present disclosure, after the transmitting end device has determined the transmission beams via which the signal is capable of being transmitted simultaneously to the receiving end device, the transmission beams for the transmission of the signal may be selected flexibly. In addition, the transmitting end device may further select a corresponding transmission mode in accordance therewith, e.g., a plurality of parallel data streams may be transmitted in a spatial division multiplexing manner via a plurality of transmission beams capable of transmitting the signal simultaneously to the receiving end device, or one data stream may be transmitted simultaneously in a spatial diversity transmission manner via a plurality of transmission beams capable of transmitting the signal to the receiving end device, so as to improve the data transmission efficiency.

In addition, in the embodiments of the present disclosure, when the transmitting end device is a base station, the transmission beam may be a downlink transmission beam, and when the transmitting end device is a terminal device, the transmission beam may be an uplink transmission beam.

In some possible embodiments of the present disclosure, the G number of transmission beam groups may correspond to G number of transceiver unit groups of the receiving end device respectively. For example, the receiving end device may receive and measure the beam training signals for the N number of transmission beams from the transmitting end device using the G number of transceiver unit groups.

The G number of transceiver unit groups may be divided by the receiving end device in advance, e.g., automatically, or in accordance with a user's input operation, or in accordance with performance of each transceiver unit, which will not be particularly defined herein. Each transceiver unit group may include transceiver units at a same amount or different amounts. Each transceiver unit group may include at least one transceiver unit, and the transceiver units in each transceiver unit group may be connected to several antenna units. The transceiver units in different transceiver unit groups may be configured to independently beamform the received signal, and transmit the beamformed signal to a baseband processing unit for the subsequent calculation.

When the receiving end device receives and measures the beam training signals for the N number of transmission beams from the transmitting end device using the G number of transceiver units, the receiving end device may receive and measure the beam training signal for each transmission beam in the N number of transmission beams using the G number of transceiver unit groups, so as to acquire G measurement results. Each measurement result may include a measurement result of the beam training signal for each transmission beam acquiring using a corresponding transceiver unit group. For example, when the number of G is 2 and the number of N is 4, two measurement results may be acquired, and each measurement result includes a measurement result of the beam training signal for the four transmission beams. In addition, the receiving end device may receive and measure the beam training signals for the N number of transmission beams using the G number of transceiver unit groups so as to acquire G measurement results, and each measurement result may include a measurement result for the beam training signal for one or more transmission beams using a corresponding transceiver unit group.

The Q number of transmission beams may include transmission beams corresponding to the measurement results with the top Q reception quality levels in the measurement results acquired after the receiving and measuring operation, or may include Q number of transmission beams corresponding to a certain quantity of measurement results selected from the measurement results corresponding to each transceiver unit group of the G number of transceiver unit groups. It should be appreciated that, the beam training signal is received and measured with respect to the same transmission beam using a same transceiver unit group, and when the measurement results have excellent reception quality levels, the same transmission beam may be selected with respect to the measurement results of different transceiver units, i.e., the Q number of transmission beams may include the same beams. For example, the beam training signal for the transmission beam a may be received and measured using a transceiver unit a and a transceiver unit b, and the measurement results of the beam training signal for the transmission beam a acquired using the transceiver unit a and the transceiver unit b may have the best reception quality levels among all the measurement results acquired using the transceiver unit a and the transceiver unit b, so the transmission beam a may be selected for both the transceiver unit a and the transceiver unit b.

In addition, the Q number of transmission beams are divided in accordance with the measurement results of the G number of transceiver unit groups, so one transmission beam may inevitably correspond to one transceiver unit group. Hence, it is able to divide the transmission beams corresponding to the same transceiver unit group into a same transmission beam group, i.e., one transmission beam group may correspond to one transceiver unit group.

During the implementation, the G number of transmission beam groups correspond to the G number of transceiver unit groups of the receiving end device respectively, so it is able for the receiving end device to receive simultaneously the signals transmitted via the transmission beam belonging to different transmission beam groups more easily, thereby to improve the data transmission efficiency.

It should be appreciated that, in the embodiments of the present disclosure, the receiving end device may not be limited to receive and measure the beam training signals using the G number of transceiver unit groups. For example, the receiving end device may also receive and measure the beam training signals using transceiver units, and select the transmission beam group corresponding to each transceiver unit in accordance with the measurement results, i.e., one transmission beam group may correspond to one transceiver unit. In this way, it is also able for the receiving end device to simultaneously receive the signal when the signal is transmitted simultaneously via the transmission beams belonging to different transmission beam groups.

In some possible embodiments of the present disclosure, the measurement results may include measurement results of the G number of transceiver unit groups acquired after the receiving end device has received and measured the beam training signal for each transmission beam in the N number of transmission beams using the G number of transceiver unit groups, and the measurement result of each transceiver unit group may include a measurement result acquired after the receiving end device has received and measured the beam training signals for the N number of transmission beams using the transceiver unit group. The Q number of transmission beams may include Q number of transmission beams selected by the receiving end device from the N number of transmission beams in accordance with the measurement results of the G number of transceiver unit groups. The G number of transmission beam groups may include G number of transmission beam groups acquired by the receiving end device after dividing the Q number of transmission beams in accordance with the measurement results of the G number of transceiver unit groups.

During the implementation, the Q number of transmission beams may be selected in accordance with the measurement results of the G number of transceiver unit groups, and the G number of transceiver unit groups may also be divided in accordance with the measurement results of the G number of transceiver unit groups. The measurement result of each transceiver unit group may include the measurement result acquired after the receiving end device has received and measured the beam training signals for the N number of transmission beams using the transceiver unit group, i.e., each transceiver unit group may receive and measure the beam training signals for all the transmission beams, so it is able to improve the accuracy of the measurement results, thereby to select the optimal Q number of transmission beams. For example, the receiving end device may receive and measure the beam training signal for each transmission beam of the N number of transmission beams from the transmitting end device using the G number of transceiver unit groups, so as to acquire the measurement results of the G number of transceiver unit groups. Then, the receiving end device may select the Q number of transmission beams from the N number of transmission beams in accordance with the measurement results of the G number of transceiver unit groups, and divide the Q number of transmission beams into the G number of transmission beam groups.

When the receiving end device receives and measures the beam training signal for each transmission beam in the N number of transmission beams from the transmitting end device using the G number of transceiver unit groups, the receiving end device may receive and measure the beam training signal for each transmission beam using all the G number of transceiver unit groups, i.e., each transceiver unit group may receive and measure the beam training signals for all the transmission beams.

In some possible embodiments of the present disclosure, the Q number of transmission beams may include Q number of transmission beams selected by the receiving end device in the N number of transmission beams and corresponding to Q number of measurement results with top Q reception quality levels in the measurement results of the G number of transceiver unit groups. The G number of transmission beam groups may include G number of transmission beam groups acquired by the receiving end device after dividing the Q number of transmission beams in accordance with the transceiver unit groups of the Q number of transmission beams corresponding to the Q number of measurement results.

During the implementation, the Q number of transmission beams corresponding to the Q number of measurement results with the top Q reception quality levels may be selected, so as to ensure the reception quality level of each transmission beam, thereby to improve the data transmission quality. For example, the receiving end device may select the Q number of measurement results with the top Q reception quality levels from the measurement results of the G number of transceiver unit groups, select the Q number of transmission beams corresponding to the Q number of measurement results from the N number of transmission beams, and divide the Q number of transmission beams into G number of transmission beam groups in accordance with the transceiver unit groups of the Q number of transmission beams corresponding to the Q number of measurement results.

When the receiving end device includes two transceiver unit groups and four downlink transmission beams are provided by the transmitting end device, eight measurement values may be acquired by the receiving end device. Table 1 shows the measurement results (with a unit of dBm).

TABLE 1

|  | Downlink transmission beam 1 | Downlink transmission beam 2 | Downlink transmission beam 3 | Downlink transmission beam 4 |
| --- | --- | --- | --- | --- |
| Transceiver unit group 1 | −70 | −68 | −54 | −80 |
| Transceiver unit group 2 | −82 | −100 | −72 | −92 |

When Q=4, the four transmission beams with the best reception quality levels may include a downlink transmission beam 3 (corresponding to a transceiver unit group 1), a downlink transmission beam 2 (corresponding to the transceiver unit group 1), a downlink transmission beam 1 (corresponding to the transceiver unit group 1) and the downlink transmission beam 3 (corresponding to a transceiver unit group 2). The downlink transmission beam 3 occurs twice and corresponds to the first transceiver unit group 1 and the second transceiver unit group 2. In other words, the transmission beam may be received by a plurality of transceiver unit groups, so in the embodiments of the present disclosure, the Q number of transmission beams may include repeated transmission beams.

Hence, the G number of transmission beam groups may include two transmission beam groups, i.e., a first group corresponding to the first transceiver unit group 1 and including the downlink transmission beam 3, the downlink transmission beam 2 and the downlink transmission beam 1, and a second group corresponding to the second transceiver unit group 2 and including the downlink transmission beam 3.

In some possible embodiments of the present disclosure, the Q number of transmission beams may include Q number of transmission beams selected by the receiving end device in the N number of transmission beams and corresponding to Q number of measurement results acquired in accordance with $Q_g$ measurement results with top $Q_g$ reception quality levels in the measurement results of each transceiver unit group, where $Q_g$s for different transceiver unit groups are a same positive integer or different positive integers, and a sum of $Q_g$s corresponding to the G number of transmission beam groups is Q. The G number of transmission beam groups may include G number of transmission beam groups acquired by the receiving end device after dividing the $Q_g$ transmission beams corresponding to the $Q_g$ measurement results of each transceiver unit group into a transmission beam group corresponding to the transceiver unit group.

During the implementation, the $Q_g$ measurement results may be selected from the measurement results of each transceiver unit group, so as to acquire the Q number of measurement results. In this way, it is able to select the $Q_g$ measurement results with the best reception quality levels for each transceiver unit group, thereby to improve the reception performance of each transceiver unit group. For example, the receiving end device may select the $Q_g$ measurement results with the top $Q_g$ reception quality levels in the measurement results of each transceiver unit group, so as to acquire the Q number of measurement results. Then, the receiving end device may select the Q number of transmission beams corresponding to the Q number of measurement results from the N number of transmission beams, and divide the $Q_g$ transmission beams corresponding to the $Q_g$ measurement results of each transceiver unit group into a transmission beam group corresponding to the transceiver unit group.

It should be appreciated that, $Q_g$ may be preconfigured by the transmitting end device for the receiving end device, or set by the receiving end device itself. In addition g=1, 2, ..., G, e.g., $Q_1=Q_2=2$, or $Q_1=2$ and $Q_2=3$, with $Q=Q_1+Q_2+\ldots+Q_G$.

To be specific, the receiving end device may rank the measurement results of a $g^{th}$ transceiver unit for each downlink transmission beam, and select the $Q_g$ downlink transmission beams with the best reception quality levels. Identically, the downlink transmission beams selected for different transceiver unit groups may include repeated transmission beams.

For example, still taking the measurement results in Table 1 as an example, when Q=4 and $Q_1=Q_2=2$, beam selection and group results will be described as follows. A transmission beam group 1 may correspond to the transceiver unit group 1 and include the downlink transmission beam 3 and the downlink transmission beam 2, and a transmission beam group 2 may correspond to the transceiver unit group 2 and include the downlink transmission beam 3 and the downlink transmission beam 1.

In addition, in the embodiments of the present disclosure, the reception quality levels of the measurement results for the transmission beams may be represented by Reference Signal Received Power (RSRP) or any other measurement value, which will not be particularly defined herein. In order to reduce the calculation burden, a certain threshold may be set by the receiving end device when ranking the transmission beams in accordance with the reception quality levels, and merely the downlink transmission beams having the reception quality levels greater than the threshold may be ranked.

In some possible embodiments of the present disclosure, each transceiver unit group of the receiving end device may include at least one transceiver unit, and each transceiver unit may include at least one reception beam. The measurement results of the G number of transceiver unit groups may include measurement results of the G number of transceiver unit groups selected from measurement result sets of the G number of transceiver unit groups acquired by the receiving end device after receiving and measuring the beam training signal for each transmission beam in the N number of transmission beams using each reception beam for the G number of transceiver unit groups. The measurement result set of each transceiver unit group may include measurement results acquired by the receiving end device after receiving and measuring the beam training signals for the N number of transmission beams using each reception beam for the transceiver unit group. The measurement results of each transceiver unit group may include N measurement results, and the N measurement results include measurement results with best reception quality levels corresponding to each transmission beam in the measurement result sets of the transceiver unit group.

During the implementation, the measurement results of the G number of transceiver unit groups may include the measurement results with the best reception quality levels corresponding to each transmission beam in the measurement result sets of each transceiver unit group, so it is able to select the optimal Q number of transmission beams. For example, when the transceiver unit group 1 includes reception beams 1 and 2, the measurement result set of the transceiver unit group 1 may include measurement results of the reception beam 1 for the N number of transmission beams and measurement results of the reception beam 2 for the N number of transmission beams. When the measurement result for the reception beam 1 for the transmission beam 1 has the best reception quality level in the measurement result set of the transceiver unit group 1 and the measurement result for the reception beam 2 for the transmission beam 1 has the best reception quality level in the measurement result set of the transceiver unit group 1, the measurement results of the transceiver unit group 1 may include the measurement result of the reception beam 1 for the transmission beam 1 and the measurement result of the reception beam 2 for the transmission beam 2.

The receiving end device may receive and measure the beam training signal for each transmission beam in the N number of transmission beams from the transmitting end device using each reception beam for the G number of transceiver unit groups, so as to acquire the measurement result sets of the G number of transceiver unit groups. Then, the receiving end device may select the measurement results of the G number of transceiver unit groups from the measurement result sets of the G number of transceiver unit groups. In this way, it is able for the receiving end device to receive and measure the beam training signal for each transmission beam using all the reception beams for all the transceiver unit groups, so as to select the optimal measurement results of each transceiver unit group for the transmission beams.

In addition, in the embodiments of the present disclosure, $N_R^{UE}$ number of reception beams may be provided at the receiving end device, each reception beam may correspond to one group of beamforming weight values, and a beamforming weight value for an $n^{th}$ beam may be expressed as $V_n=[v_1^n \ v_2^n \ \ldots \ v_L^n]^T$, where L represents the quantity of antenna units for beamforming and it may be smaller than the quantity of antenna units for the receiving end device. For example, signals received via L antenna units may be weighted with a beamforming weight value and combined, and then the combined signals may be transmitted to one transceiver unit, so as to acquire a corresponding measurement result.

In some possible embodiments of the present disclosure, the receiving, by the transmitting end device, the identification information about the Q number of transmission beams in the N number of transmission beams and the group information about each transmission beam in the Q number of transmission beams from the receiving end device may include receiving, by the transmitting end device, the identification information about the Q number of transmission beams in the N number of transmission beams as well as the group information and subgroup information about each transmission beam in the Q number of transmission beams from the receiving end device, and the transmission beams corresponding to a same reception beam in each transmission beam group may belong to one transmission beam subgroup. The transmission beam determination method may further include determining, by the transmitting end device, that a signal is capable of being transmitted simultaneously to the receiving end device via the transmission beams belonging to a same transmission beam subgroup in the Q number of transmission beams.

Figure 3:
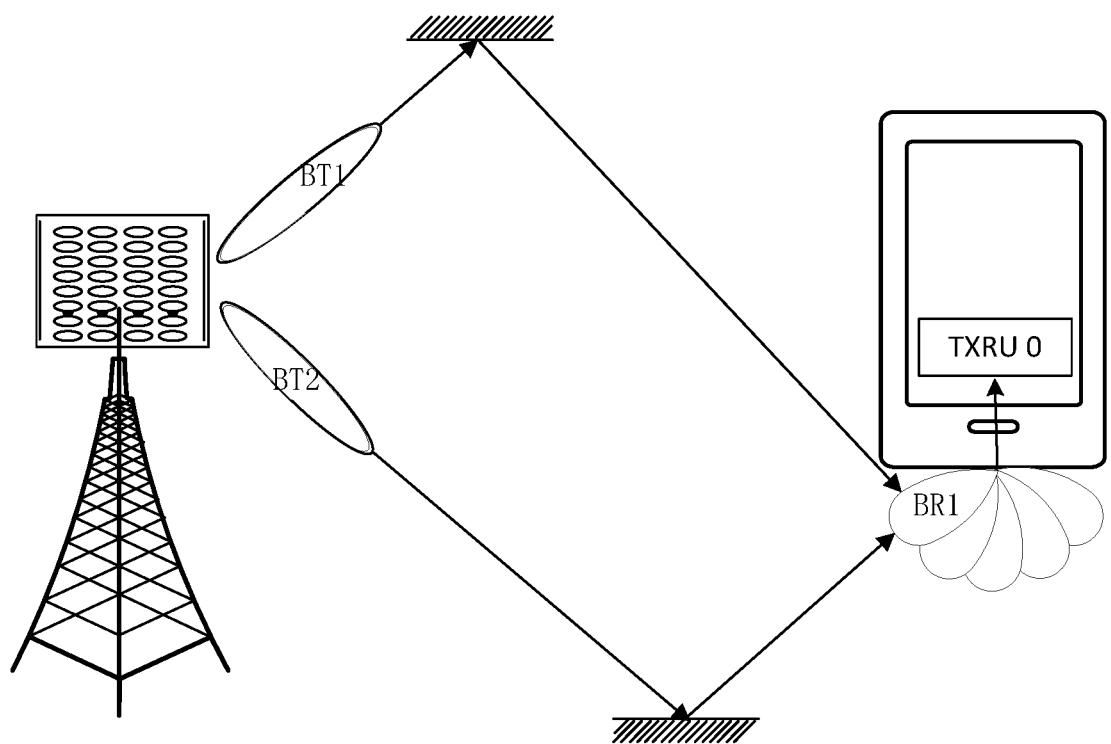
FIG. 3 is a schematic view showing the transmission of a signal according to some embodiments of the present disclosure.

During the implementation, the group information and the subgroup information about each transmission beam in the Q number of transmission beams may be acquired, so as to determine the transmission beam group and the transmission beam subgroup to which each transmission beam belongs, thereby to determine that the signal is capable of being transmitted simultaneously to the receiving end device via the transmission beams belonging to a same transmission beam subgroup in the Q number of transmission beams, i.e., to determine that the transmission beams capable of being received simultaneously by the receiving end device belong to the same transmission beam subgroup. In addition, it is also able to determine that the signal is capable of being transmitted simultaneously to the receiving end device via the transmission beams in the Q number of transmission beams belonging to different transmission beam groups, thereby to determine more transmission beams capable of transmitting the signal to the receiving end device simultaneously, and improve the data transmission efficiency. For example, when a transmission beam 1 belongs to a transmission beam group 1, a transmission beam 2 belongs to the transmission beam group 1, a transmission beam 3 belongs to the transmission beam group 1, the transmission beams 1 and the transmission beam 2 belong to a transmission subgroup 1, and a transmission beam 4 belongs to a transmission beam group 2, the transmitting end device may determine that the signal is capable of being transmitted simultaneously to the receiving end device via the transmission beam 1 and the transmission beam 2. In addition, a signal may be transmitted simultaneously to the receiving end device via the transmission beam 1 and the transmission beam 4, a signal may be transmitted simultaneously to the receiving end device via the transmission beam 2 and the transmission beam 4, and a signal may be transmitted simultaneously to the receiving end device via the transmission beam 3 and the transmission beam 4. For example, as shown in FIG. 3, a signal may be transmitted simultaneously to the receiving end device via a transmission beam (BT) 1 and a transmission beam (BT) 2, and received simultaneously by a reception beam (BR) 1 for a transceiver unit (TXRU) 0 of the receiving end device. For another example, as shown in FIG. 4, a signal may be transmitted simultaneously to the receiving end device via the transmission beam (BT) 1 and a transmission beam (BT) 4, and received simultaneously by the reception beam (BR) 1 for a transceiver unit (TXRU) 0 and a reception beam (BR) 2 for a transceiver unit (TXRU) 1 of the receiving end device.

During the implementation, the receiving end device may select one reception beam for each of the Q number of transmission beams from candidate reception beams for the receiving end device. The receiving end device may divide the transmission beams in each transmission beam group corresponding to the same reception beam into one transmission beam subgroup. The transmitting end device may transmit the identification information about the Q number of transmission beams in the N number of transmission beams as well as the group information and the subgroup information about each transmission beam in the Q number of transmission beams to the transmitting end device. The candidate reception beams for the receiving end device may include all reception beams for the receiving end device. Here, the candidate reception beams may be understood as candidate reception beams corresponding to each transmission beam for the transmitting end device, i.e., the reception beam corresponding to each transmission beam may be selected from the candidate reception beams. In addition, the candidate reception beams may be preconfigured by the receiving end device, or set by a user, which will not be particularly defined herein.

For example, the receiving end device may further divide $Q_g$ downlink transmission beams in a $g^{th}$ group into $P_g$ subgroups, and a $p^{th}$ subgroup ma include $R_p$ downlink transmission beams, where p=1, 2, . . . , $P_g$, and $R_1+R_2+ \ldots +R_{Pg} \leq Q_g$. Some transmission beams in the $g^{th}$ group may not belong to any subgroup, i.e., $R_1+R_2+ \ldots +R_{Pg} < Q_g$. When any two beams in the $g^{th}$ transmission beam groups are incapable of being received by the receiving end device simultaneously, $P_g=0$, i.e., the $g^{th}$ transmission beam group may not include any subgroup. When one beam in the $g^{th}$ transmission beam group is incapable of being received simultaneously with any other beam in the same transmission beam group, the transmission beam may not belong to any beam subgroup. Alternatively, a specific subgroup may be provided, and beams in the $g^{th}$ group that are incapable of being received simultaneously with any other beams may belong to this subgroup.

For example, when the transmission beam group 1 includes the transmission beam 1, the transmission beam 2 and the transmission beam 3, and the receiving end device selects the reception beam 1, the reception beam 1 and the reception beam 2 for the transmission beam 1, the transmission beam 2 and the transmission beam 3 respectively, the transmission beam 1 and the transmission beam 2 may correspond to the same reception beam 1, i.e., the receiving end device may put the transmission beam 1 and the transmission beam 2 into a same transmission beam subgroup.

In some possible embodiments of the present disclosure, the reception beam corresponding to each transmission beam may include a reception beam corresponding to a measurement result with the best reception quality level acquired by the receiving end device in the measurement results of the beam training signal for the transmission beam using all candidate reception beams.

During the implementation, the reception beam corresponding to each transmission beam may include a reception beam with the best reception quality level corresponding to the transmission beam in all the reception beams for the receiving end device, so as to improve the data transmission quality.

During the implementation, the receiving end device may acquire the measurement results of the beam training signal for each transmission beam using all the candidate reception beams for the receiving end device, and select the reception beam corresponding to the measurement result with the best reception quality level in the acquired measurement results as the reception beam for the transmission beam.

In some possible embodiments of the present disclosure, the receiving, by the transmitting end device, the identification information about the Q number of transmission beams in the N number of transmission beams as well as the group information and the subgroup information about each transmission beam in the Q number of transmission beams from the receiving end device may include: receiving, by the transmitting end device, group information about the G number of transmission beam groups from the receiving end device, the group information about each transmission beam group including transmission beam subgroup information about each transmission beam subgroup in the transmission beam group, and the transmission beam subgroup information including identification information about each transmission beam in the transmission beam subgroup; or receiving, by the transmitting end device, beam division information about the Q number of transmission beams from the receiving end device, the beam division information about each transmission beam including identification information about the transmission beam, a group identity (ID) of the transmission beam group to which the transmission beam belongs, and a subgroup ID of the transmission beam subgroup to which the transmission beam belongs.

The identification information about the transmission beam may include a serial number of each transmission beam defined in a system, or an index for transmitting the beam training signal (e.g., a resource index, a sequence index, a time index or a port index), or a combination thereof, which will not be particularly defined herein.

In a first mode, a form in Table 2 may be adopted. In some possible embodiments of the present disclosure, the receiving end device may assign a unit ID for each of the groups and subgroups, and report the group or subgroup together with the ID. For example, the group information about each transmission beam group may further include a group ID of the transmission beam group, and the subgroup information about each transmission beam may further include a subgroup ID of the transmission beam subgroup. As shown in FIG. 2, a transmission beam ID (m, n, q) is an ID of a $q^{th}$ downlink transmission beam in an $n^{th}$ subgroup of an $m^{th}$ downlink transmission group.

TABLE 2

| Transmission beam ID (1, 1, 1) | First subgroup | First group |
|---|---|---|
| Transmission beam ID (1, 1, 2) | | |
| ... | | |
| Transmission beam ID (1, 2, 1) | Second subgroup | |
| Transmission beam ID (1, 2, 2) | | |
| ... | | |
| ... | | |
| Transmission beam ID (1, $P_1$, 1) | $(P_1)^{th}$ subgroup | |
| Transmission beam ID (1, $P_1$, 2) | | |
| ... | | |
| Transmission beam ID (2, 1, 1) | First subgroup | Second group |

TABLE 2-continued

| Transmission beam ID (2, 1, 2) | | |
|---|---|---|
| ... | | |
| Transmission beam ID (2, 2, 1) | Second subgroup | |
| Transmission beam ID (2, 2, 2) | | |
| ... | | |
| ... | | |
| Transmission beam ID (2, $P_2$, 1) | $(P_2)^{th}$ subgroup | |
| Transmission beam ID (2, $P_2$, 2) | | |
| ... | | |
| ... | | |
| Transmission beam ID (G, 1, 1) | First subgroup | $G^{th}$ group |
| Transmission beam ID (G, 1, 2) | | |
| ... | | |
| Transmission beam ID (G, 2, 1) | Second subgroup | |
| Transmission beam ID (G, 2, 2) | | |
| ... | | |
| ... | | |
| Transmission beam ID (G, $P_G$, 1) | $(P_G)^{th}$ subgroup | |
| Transmission beam ID (G, $P_G$, 2) | | |
| ... | | |

It should be appreciated that, for each downlink transmission beam, it is unnecessary to report the group ID and the subgroup ID repeatedly. To be specific, a common group ID or subgroup ID of the downlink transmission beams belonging to a same group or subgroup may be reported, so as to reduce the transmission overhead.

In a second mode, the receiving end device may assign a unit ID for each of the groups and subgroups, and Table 3 shows information about the division of the transmission beams reported by the receiving end device.

TABLE 3

| Transmission beam ID 1 | Subgroup ID $s_1$ | Group ID $g_1$ |
|---|---|---|
| Transmission beam ID 2 | Subgroup ID $s_2$ | Group ID $g_2$ |
| Transmission beam ID 3 | Subgroup ID $s_3$ | Group ID $g_3$ |
| ... | | |
| Transmission beam ID Q | Subgroup ID $g_Q$ | Group ID $g_Q$ |

In Table 3, $g_i$ represents an ID of a downlink transmission group to which an $i^{th}$ transmission beam belongs, $s_i$ represents an ID of a downlink transmission subgroup to which the $i^{th}$ transmission beam belongs, i=1, 2, . . . , Q, $g_i \in \{1, 2, \ldots, G\}$, and $s_i \in \{1, 2, \ldots, P_{gi}\}$.

Through the above two modes, it is able to report the group information and the subgroup information about each transmission beam to the transmitting end device flexibly.

In some possible embodiments of the present disclosure, when the G number of transmission beam groups include a target transmission beam group, the target transmission beam group may include a target transmission beam. A reception beam corresponding to the target transmission beam may be different from a reception beam corresponding to any of the other transmission beams in the target transmission beam group, and a subgroup ID of the target transmission beam may be null or the target transmission beam may have a predetermined subgroup ID. In this way, for a downlink transmission beam which is incapable of being received simultaneously with any other beam in a same subgroup, its subgroup ID may be null (i.e., it may not belong to any subgroup), or a specific subgroup ID, e.g., −1, may be assigned to this downlink transmission beam. In this way, it is able for the transmitting end device to accurately determine the transmission beams capable of transmitting the signal to the receiving end device simultaneously.

It should be appreciated that, the above-mentioned embodiments may be implemented separately or in any combined form.

According to the embodiments of the present disclosure, the transmitting end device may transmit the beam training signals for the N number of transmission beams to the receiving end device, where N is a positive integer. Next, the transmitting end device may receive the identification information about the Q number of transmission beams in the N number of transmission beams and the group information about each transmission beam in the Q number of transmission beams from the receiving end device. The Q number of transmission beams may include the G number of transmission beam groups, and the G number of transmission beam groups may be divided by the receiving end device in accordance with the measurement results, the measurement results may be measurement results acquired by the receiving end device after receiving and measuring the beam training signals from the transmitting end device, and Q and G are each a positive integer. Then, the transmitting end device may determine that the signal is capable of transmitting simultaneously to the receiving end device via the transmission beams in the Q number of transmission beams belonging to different transmission beam groups. As a result, it is able for the transmitting end device to determine the transmission beams via which the signal is transmitted to the receiving end device simultaneously.

The present disclosure further provides in some embodiments a transmission beam determination method which, as shown in FIG. 5, includes: Step 501 of receiving and measuring, by a receiving end device, beam training signals for N number of transmission beams from a transmitting end device, selecting Q number of transmission beams from the N number of transmission beams in accordance with a measurement result, and dividing the Q number of transmission beams into G number of transmission beam groups, N, Q and G being each a positive integer; and Step 502 of transmitting, by the receiving end device, identification information about the Q number of transmission beams and group information about each transmission beam in the Q number of transmission beams to the transmitting end device, so as to enable the transmitting end device to determine that a signal is capable of being transmitted simultaneously to the receiving end device via transmission beams in the Q number of transmission beams belonging to different transmission beam groups.

In some possible embodiments of the present disclosure, the receiving and measuring, by the receiving end device, the beam training signals for the N number of transmission beams from the transmitting end device may include receiving and measuring, by the receiving end device, the beam training signals for the N number of transmission beams from the transmitting end device using G number of transceiver unit groups, and the G number of transmission beam groups correspond to G number of transceiver unit groups of the receiving end device respectively.

In some possible embodiments of the present disclosure, the receiving and measuring, by the receiving end device, the beam training signals for the N number of transmission beams from the transmitting end device, selecting the Q number of transmission beams from the N number of transmission beams in accordance with the measurement result, and dividing the Q number of transmission beams into the G number of transmission beam groups may include: receiving and measuring, by the receiving end device, the beam training signal for each transmission beam in the N number of transmission beams from the transmitting end device using the G number of transceiver unit groups to acquire measurement results of the G number of transceiver unit groups, the measurement result of each transceiver unit group including a measurement result acquired after the receiving end device has received and measured the beam training signals for the N number of transmission beams using the transceiver unit group; and selecting, by the receiving end device, the Q number of transmission beams from the N number of transmission beams in accordance with the measurement results of the G number of transceiver unit groups, and dividing the Q number of transmission beams into the G number of transmission beam groups.

In some possible embodiments of the present disclosure, the selecting, by the receiving end device, the Q number of transmission beams from the N number of transmission beams in accordance with the measurement results of the G number of transceiver unit groups, and dividing the Q number of transmission beams into the G number of transmission beam groups may include selecting, by the receiving end device, Q number of measurement results with top Q reception quality levels in the measurement results of the G number of transceiver unit groups, selecting the Q number of transmission beams corresponding to the Q number of measurement results in the N number of transmission beams, and dividing the Q number of transmission beams into the G number of transmission beam groups in accordance with the transceiver unit groups of the Q number of transmission beams corresponding to the Q number of measurement results.

In some possible embodiments of the present disclosure, the selecting, by the receiving end device, the Q number of transmission beams from the N number of transmission beams in accordance with the measurement results of the G number of transceiver unit groups and dividing the Q number of transmission beams into the G number of transmission beam groups may include: selecting, by the receiving end device, $Q_g$ measurement results with top $Q_g$ reception quality levels in the measurement results of each transceiver unit group to acquire Q number of measurement results, $Q_g$s for different transceiver unit groups being a same positive integer or different positive integers, and a sum of $Q_g$s corresponding to the G number of transmission beam groups being Q; and selecting, by the receiving end device, the Q number of transmission beams corresponding to the Q number of measurement results from the N number of transmission beams, and dividing the $Q_g$ transmission beams corresponding to the $Q_g$ measurement results of each transceiver unit group into a transmission beam group corresponding to the transceiver unit group.

In some possible embodiments of the present disclosure, each transceiver unit group of the receiving end device may include at least one transceiver unit, and each transceiver unit may include at least one reception beam. The receiving and measuring, by the receiving end device, the beam training signal for each transmission beam of the N number of transmission beams from the transmission end using the G number of transceiver unit groups to acquire the measurement results of the G number of transceiver unit groups may include: receiving and measuring, by the receiving end device, the beam training signal for each transmission beam of the N number of transmission beams from the transmitting end device using each reception beam for the G number of transceiver unit group to acquire measurement result sets of the G number of transceiver unit groups, the measurement result set of each transceiver unit group including measurement results acquired by the receiving end device after receiving and measuring the beam training signals for the N number of transmission beams using each reception beam for the transceiver unit group; and selecting, by the receiving end device, the measurement results of the G number of transceiver unit groups from the measurement result set of the G number of transceiver unit groups, the measurement results of each transceiver unit group including N measurement results, and the N measurement results including measurement results with best reception quality levels corresponding to each transmission beam in the measurement result sets of the transceiver unit group.

In some possible embodiments of the present disclosure, the transmission beam determination method may further include: selecting, by the receiving end device, one reception beam for each of the Q number of transmission beams from candidate reception beams for the receiving end device; and dividing, by the receiving end device, transmission beams in each transmission beam group corresponding to a same reception beam into one transmission beam subgroup. The transmitting, by the receiving end device, the identification information about the Q number of transmission beams in the N number of transmission beams and the subgroup information about each transmission beam in the Q number of transmission beams to the transmitting end device may include transmitting, by the receiving end device, the identification information about the Q number of transmission beams in the N number of transmission beams as well as the group information and subgroup information about each transmission beam in the Q number of transmission beams to the transmitting end device.

In some possible embodiments of the present disclosure, the selecting, by the receiving end device, one reception beam for each of the Q number of transmission beams in the candidate reception beams for the receiving end device may include acquiring, by the receiving end device, measurement results of the beam training signal for each transmission beam using all the candidate reception beams for the receiving end device, and selecting a reception beam corresponding to a measurement result with a best reception quality level in the acquired measurement results as the reception beam for the transmission beam.

In some possible embodiments of the present disclosure, the transmitting, by the transmitting end device, the identification information about the Q number of transmission beams in the N number of transmission beams as well as the group information and subgroup information about each transmission beam in the Q number of transmission beams to the transmitting end device may include: transmitting, by the receiving end device, group information about the G number of transmission beam groups to the transmitting end device, the group information about each transmission beam group including transmission beam subgroup information about each transmission beam subgroup in the transmission beam group, and the transmission beam subgroup information including the identification information about each transmission beam in the transmission beam subgroup; or transmitting, by the receiving end device, beam division information about the Q number of transmission beams to the transmitting end device, the beam division information about each transmission beam including identification information about the transmission beam, a group ID of the transmission beam group to which the transmission beam belongs, and a subgroup ID of the transmission beam subgroup to which the transmission beam belongs.

In some possible embodiments of the present disclosure, when the G number of transmission beam groups include a target transmission beam group, the target transmission beam group may include a target transmission beam. A reception beam corresponding to the target transmission beam may be different from a reception beam corresponding to any of the other transmission beams in the target transmission beam group, and a subgroup ID of the target transmission beam may be null or the target transmission beam may have a predetermined subgroup ID.

It should be appreciated that, the receiving end device in the embodiments of the present disclosure may include one or more transceiver units.

It should be further appreciated that, the implementation of the transmission beam determination method may refer to relevant description about the receiving end device in FIG. 2 with a same beneficial effect, and thus will not be particularly defined herein.

Figure 6:
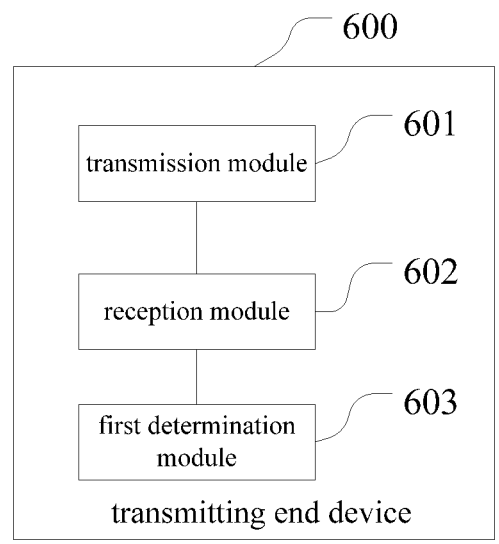
FIG. 6 is a schematic view showing a transmitting end device according to some embodiments of the present disclosure.

The present disclosure further provides in some embodiments a transmitting end device 600 which, as shown in FIG. 6, includes: a transmission module 601 configured to transmit beam training signals for N number of transmission beams to a receiving end device, N being a positive integer; a reception module 602 configured to receive identification information about Q number of transmission beams in the N number of transmission beams and group information about each transmission beam in the Q number of transmission beams from the receiving end device, the Q number of transmission beams including G number of transmission beam groups, the G number of transmission beam groups being acquired by the receiving end device in accordance with a measurement result, the measurement result being a measurement result acquired after the receiving end device has received and measured the beam training signals from the transmitting end device, Q and G being each a positive integer; and a first determination module 603 configured to determine that a signal is capable of being transmitted simultaneously to the receiving end device via transmission beams in the Q number of transmission beams belonging to different transmission beam groups.

In some possible embodiments of the present disclosure, the G number of transmission beam groups may correspond to G number of transceiver unit groups of the receiving end device respectively.

In some possible embodiments of the present disclosure, the measurement results may include measurement results of the G number of transceiver unit groups acquired after the receiving end device has received and measured the beam training signal for each transmission beam in the N number of transmission beams using the G number of transceiver unit groups, and the measurement result of each transceiver unit group may include a measurement result acquired after the receiving end device has received and measured the beam training signals for the N number of transmission beams using the transceiver unit group. The Q number of transmission beams may include Q number of transmission beams selected by the receiving end device from the N number of transmission beams in accordance with the measurement results of the G number of transceiver unit groups. The G number of transmission beam groups may include G number of transmission beam groups acquired by the receiving end device after dividing the Q number of transmission beams in accordance with the measurement results of the G number of transceiver unit groups.

In some possible embodiments of the present disclosure, the Q number of transmission beams may include Q number of transmission beams selected by the receiving end device in the N number of transmission beams and corresponding to Q number of measurement results with top Q reception quality levels in the measurement results of the G number of transceiver unit groups. The G number of transmission beam groups may include G number of transmission beam groups acquired by the receiving end device after dividing the Q number of transmission beams in accordance with the transceiver unit groups of the Q number of transmission beams corresponding to the Q number of measurement results.

In some possible embodiments of the present disclosure, the Q number of transmission beams may include Q number of transmission beams selected by the receiving end device in the N number of transmission beams and corresponding to Q number of measurement results acquired in accordance with $Q_g$ measurement results with top $Q_g$ reception quality levels in the measurement results of each transceiver unit group, where $Q_g$s for different transceiver unit groups are a same positive integer or different positive integers, and a sum of $Q_g$s corresponding to the G number of transmission beam groups is Q. The G number of transmission beam groups may include G number of transmission beam groups acquired by the receiving end device after dividing the $Q_g$ transmission beams corresponding to the $Q_g$ measurement results of each transceiver unit group into a transmission beam group corresponding to the transceiver unit group.

In some possible embodiments of the present disclosure, each transceiver unit group of the receiving end device may include at least one transceiver unit, and each transceiver unit may include at least one reception beam. The measurement results of the G number of transceiver unit groups may include measurement results of the G number of transceiver unit groups selected from measurement result sets of the G number of transceiver unit groups acquired by the receiving end device after receiving and measuring the beam training signal for each transmission beam in the N number of transmission beams using each reception beam for the G number of transceiver unit groups. The measurement result set of each transceiver unit group may include measurement results acquired by the receiving end device after receiving and measuring the beam training signals for the N number of transmission beams using each reception beam for the transceiver unit group. The measurement results of each transceiver unit group may include N measurement results, and the N measurement results include measurement results with best reception quality levels corresponding to each transmission beam in the measurement result sets of the transceiver unit group.

In some possible embodiments of the present disclosure, the reception module is further configured to receive the identification information about the Q number of transmission beams in the N number of transmission beams as well as the group information and subgroup information about each transmission beam in the Q number of transmission beams from the receiving end device, and the transmission beams corresponding to a same reception beam in each transmission beam group may belong to one transmission beam subgroup.

Figure 7:
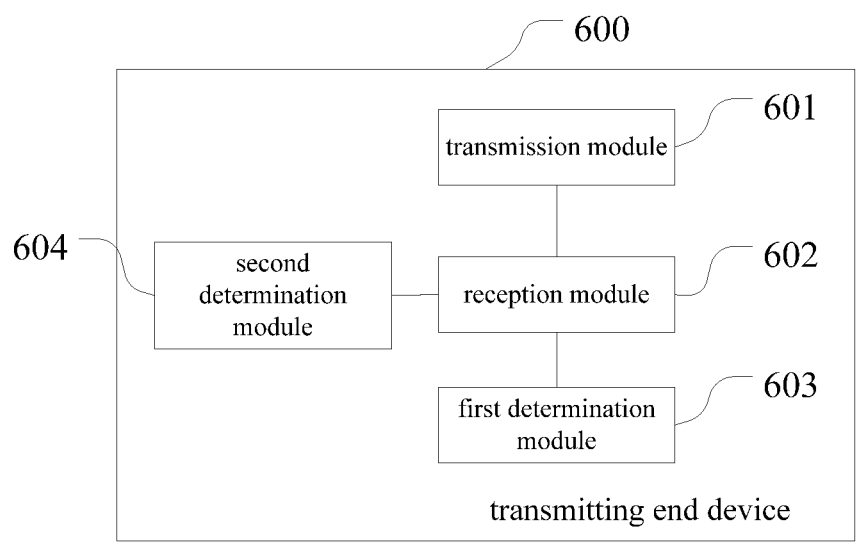
FIG. 7 is another schematic view showing the transmitting end device according to some embodiments of the present disclosure.

As shown in FIG. 7, the transmitting end device 600 may further include a second determination module 604 configured to determine that a signal is capable of being transmitted simultaneously to the receiving end device via the transmission beams belonging to a same transmission beam subgroup in the Q number of transmission beams.

In some possible embodiments of the present disclosure, the reception beam corresponding to each transmission beam may include a reception beam corresponding to a measurement result with the best reception quality level acquired by the receiving end device in the measurement results of the beam training signals for the transmission beam using all candidate reception beams.

In some possible embodiments of the present disclosure, the reception module is further configured to: receive group information about the G number of transmission beam groups from the receiving end device, the group information about each transmission beam group including transmission beam subgroup information about each transmission beam subgroup in the transmission beam group, and the transmission beam subgroup information including identification information about each transmission beam in the transmission beam subgroup; or receive beam division information about the Q number of transmission beams from the receiving end device, the beam division information about each transmission beam including identification information about the transmission beam, a group ID of the transmission beam group to which the transmission beam belongs, and a subgroup ID of the transmission beam subgroup to which the transmission beam belongs.

In some possible embodiments of the present disclosure, when the G number of transmission beam groups include a target transmission beam group, the target transmission beam group includes a target transmission beam. A reception beam corresponding to the target transmission beam is different from a reception beam corresponding to any of the other transmission beams in the target transmission beam group, and a subgroup ID of the target transmission beam is null or the target transmission beam has a predetermined subgroup ID.

It should be appreciated that, the implementation of the transmitting end device 600 may refer to the implementation of the transmitting end device in the above-mentioned method embodiments with a same beneficial effect, and thus will not be particularly defined herein.

Figure 8:
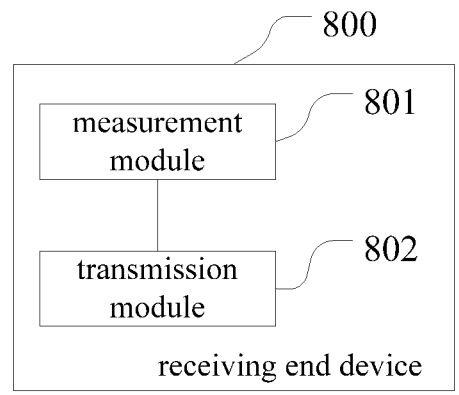
FIG. 8 is a schematic view showing a receiving end device according to some embodiments of the present disclosure.

The present disclosure further provides in some embodiments a receiving end device 800 which, as shown in FIG. 8, includes: a measurement module 801 configured to receive and measure beam training signals for N number of transmission beams from a transmitting end device, select Q number of transmission beams from the N number of transmission beams in accordance with a measurement result, and divide the Q number of transmission beams into G number of transmission beam groups, N, Q and G being each a positive integer; and a transmission module 802 configured to transmit identification information about the Q number of transmission beams and group information about each transmission beam in the Q number of transmission beams to the transmitting end device, so as to enable the transmitting end device to determine that a signal is capable of being transmitted simultaneously to the receiving end device via transmission beams in the Q number of transmission beams belonging to different transmission beam groups.

In some possible embodiments of the present disclosure, the measurement module 801 is configured to receive and measure the beam training signals for the N number of transmission beams from the transmitting end device using G number of transceiver unit groups, and the G number of transmission beam groups may correspond to G number of transceiver unit groups of the receiving end device respectively.

Figure 9:
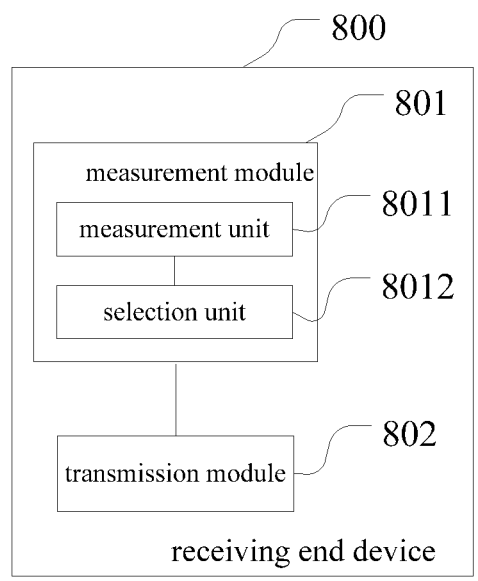
FIG. 9 is another schematic view showing the receiving end device according to some embodiments of the present disclosure.

In some possible embodiments of the present disclosure, as shown in FIG. 9, the measurement module 801 may include: a measurement unit 8011 configured to receive and measure the beam training signal for each transmission beam in the N number of transmission beams from the transmitting end device using the G number of transceiver unit groups to acquire measurement results of the G number of transceiver unit groups, the measurement result of each transceiver unit group including a measurement result acquired after the receiving end device has received and measured the beam training signals for the N number of transmission beams using the transceiver unit group; and a selection unit 8012 configured to select the Q number of transmission beams from the N number of transmission beams in accordance with the measurement results of the G number of transceiver unit groups, and divide the Q number of transmission beams into the G number of transmission beam groups.

In some possible embodiments of the present disclosure, the selection unit 8012 is further configured to select Q number of measurement results with top Q reception quality levels in the measurement results of the G number of transceiver unit groups, select the Q number of transmission beams corresponding to the Q number of measurement results in the N number of transmission beams, and divide the Q number of transmission beams into the G number of transmission beam groups in accordance with the transceiver unit groups of the Q number of transmission beams corresponding to the Q number of measurement results.

Figure 10:
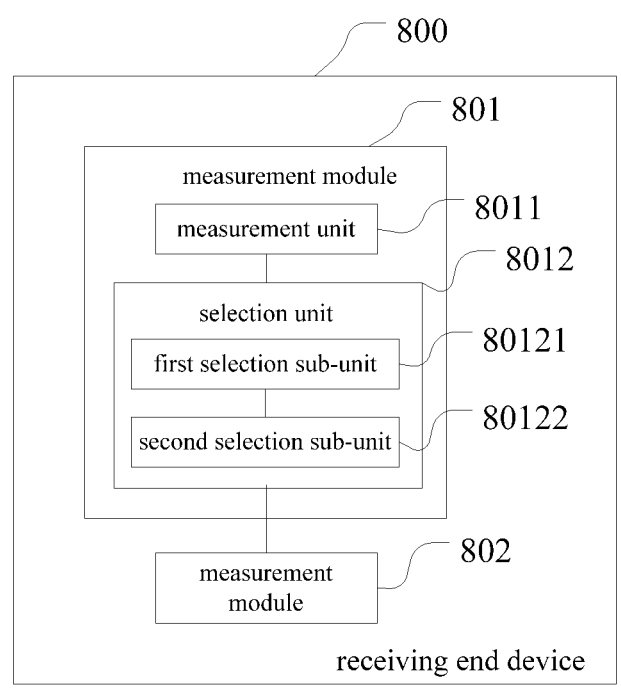
FIG. 10 is another schematic view showing the receiving end device according to some embodiments of the present disclosure.

In some possible embodiments of the present disclosure, as shown in FIG. 10, the selection unit 8012 may include: a first selection sub-unit 80121 configured to select $Q_g$ measurement results with top $Q_g$ reception quality levels in the measurement results of each transceiver unit group to acquire Q number of measurement results, $Q_g$s for different transceiver unit groups being a same positive integer or different positive integers, and a sum of $Q_g$s corresponding to the G number of transmission beam groups being Q; and a second selection sub-unit 80122 configured to select the Q number of transmission beams corresponding to the Q number of measurement results from the N number of transmission beams, and divide the $Q_g$ transmission beams corresponding to the $Q_g$ measurement results of each transceiver unit group into a transmission beam group corresponding to the transceiver unit group.

Figure 11:
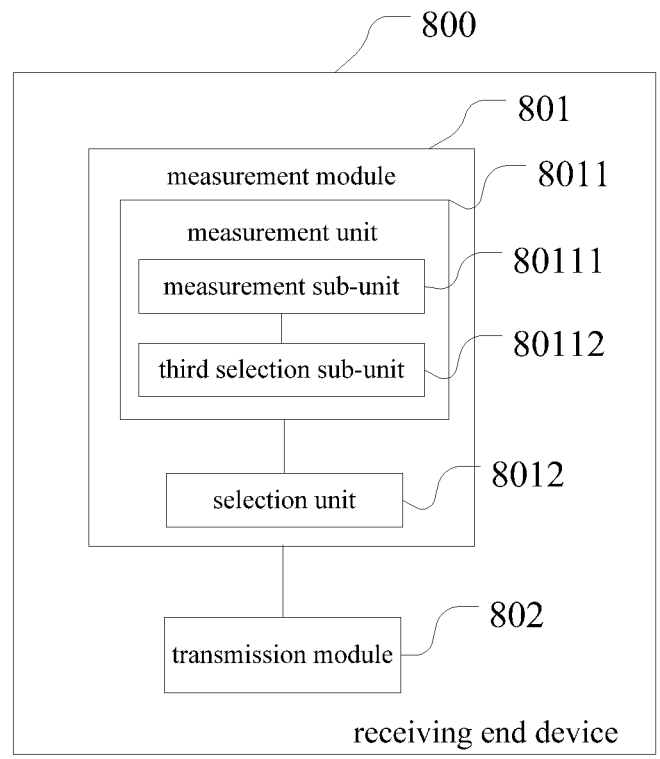
FIG. 11 is yet another schematic view showing the receiving end device according to some embodiments of the present disclosure.

In some possible embodiments of the present disclosure, each transceiver unit group of the receiving end device may include at least one transceiver unit, and each transceiver unit may include at least one reception beam. As shown in FIG. 11, the measurement unit 8011 may include: a measurement sub-unit 80111 configured to receive and measure the beam training signal for each transmission beam of the N number of transmission beams from the transmitting end device using each reception beam for the G number of transceiver unit group to acquire measurement result sets of the G number of transceiver unit groups, the measurement result set of each transceiver unit group including measurement results acquired by the receiving end device after receiving and measuring the beam training signals for the N number of transmission beams using each reception beam for the transceiver unit group; and a third selection sub-unit 80112 configured to select the measurement results of the G number of transceiver unit groups from the measurement result set of the G number of transceiver unit groups, the measurement results of each transceiver unit group including N measurement results, and the N measurement results including measurement results with best reception quality levels corresponding to each transmission beam in the measurement result sets of the transceiver unit group.

Figure 12:
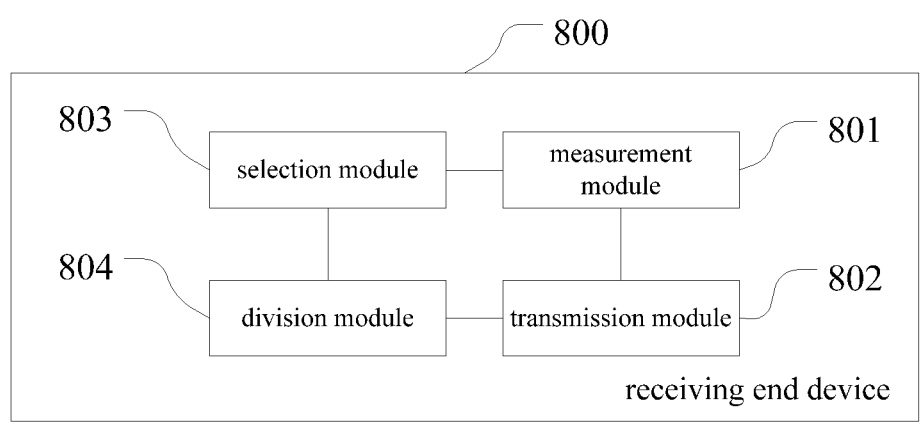
FIG. 12 is still yet another schematic view showing the receiving end device according to some embodiments of the present disclosure.

In some possible embodiments of the present disclosure, as shown in FIG. 12, the receiving end device 800 may further include: a selection module 803 configured to select one reception beam for each of the Q number of transmission beams from candidate reception beams for the receiving end device; and a division module 804 configured to divide transmission beams in each transmission beam group corresponding to a same reception beam into one transmission beam subgroup. The transmission module 802 is further configured to transmit the identification information about the Q number of transmission beams in the N number of transmission beams as well as the group information and subgroup information about each transmission beam in the Q number of transmission beams to the transmitting end device.

In some possible embodiments of the present disclosure, the selection module 803 is further configured to acquire measurement results of the beam training signal for each transmission beam using all the candidate reception beams for the receiving end device, and select a reception beam corresponding to a measurement result with a best reception quality level in the acquired measurement results as the reception beam for the transmission beam.

In some possible embodiments of the present disclosure, the transmission module 802 is further configured to: transmit group information about the G number of transmission beam groups to the transmitting end device, the group information about each transmission beam group including transmission beam subgroup information about each transmission beam subgroup in the transmission beam group, and the transmission beam subgroup information including the identification information about each transmission beam in the transmission beam subgroup; or transmit beam division information about the Q number of transmission beams to the transmitting end device, the beam division information about each transmission beam including identification information about the transmission beam, a group ID of the transmission beam group to which the transmission beam belongs, and a subgroup ID of the transmission beam subgroup to which the transmission beam belongs.

In some possible embodiments of the present disclosure, when the G number of transmission beam groups may include a target transmission beam group, the target transmission beam group may include a target transmission beam. A reception beam corresponding to the target transmission beam may be different from a reception beam corresponding to any of the other transmission beams in the target transmission beam group, and a subgroup ID of the target transmission beam may be null or the target transmission beam may have a predetermined subgroup ID.

It should be appreciated that, the implementation of the receiving end device 800 may refer to the implementation of the receiving end device in the above-mentioned method embodiments with a same beneficial effect, and thus will not be particularly defined herein.

Figure 13:
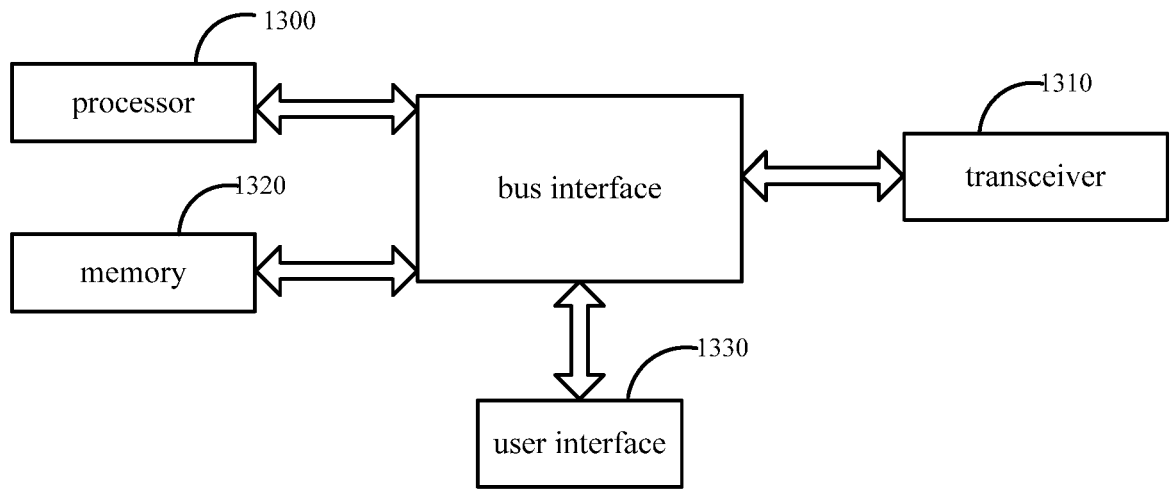
FIG. 13 is yet another schematic view showing the transmitting end device according to some embodiments of the present disclosure.

The present disclosure further provides in some embodiments a transmitting end device which, as shown in FIG. 13, includes a processor 1300, a transceiver 1310, a memory 1320, a user interface 1330 and a bus interface. The processor 1300 is configured to read a program stored in the memory 1320, so as to: transmit through the transceiver 1310 beam training signals for N number of transmission beams to a receiving end device, N being a positive integer; receive through the transceiver 1310 identification information about Q number of transmission beams in the N number of transmission beams and group information about each transmission beam in the Q number of transmission beams from the receiving end device, the Q number of transmission beams including G number of transmission beam groups, the G number of transmission beam groups being acquired by the receiving end device in accordance with a measurement result, the measurement result being a measurement result acquired after the receiving end device has received and measured the beam training signals from the transmitting end device, Q and G being each a positive integer; and determine that a signal is capable of being transmitted simultaneously to the receiving end device via transmission beams in the Q number of transmission beams belonging to different transmission beam groups. The transceiver 1310 is configured to receive and transmit data under the control of the processor 1300.

In FIG. 13, bus architecture may include a number of buses and bridges connected to each other, so as to connect various circuits for one or more processors 1300 and one or more memories 1320. In addition, as is known in the art, the bus architecture may be used to connect any other circuits, such as a circuit for a peripheral device, a circuit for a voltage stabilizer and a power management circuit. The bus interface may be provided, and the transceiver 1310 may consist of a plurality of elements, i.e., a transmitter and a receiver for communication with any other devices over a transmission medium. With respect to different UEs, the user interface 1330 may also be provided for devices which are to be arranged inside or outside the UE, and these devices may include but not limited to a keypad, a display, a speaker, a microphone and a joystick. The processor 1300 may take charge of managing the bus architecture as well as general processings. The memory 1320 may store therein data for the operation of the processor 1300.

In some possible embodiments of the present disclosure, the G number of transmission beam groups may correspond to G number of transceiver unit groups of the receiving end device respectively.

In some possible embodiments of the present disclosure, the measurement results may include measurement results of the G number of transceiver unit groups acquired after the receiving end device has received and measured the beam training signal for each transmission beam in the N number of transmission beams using the G number of transceiver unit groups, and the measurement result of each transceiver unit group may include a measurement result acquired after the receiving end device has received and measured the beam training signals for the N number of transmission beams using the transceiver unit group. The Q number of transmission beams may include Q number of transmission beams selected by the receiving end device from the N number of transmission beams in accordance with the measurement results of the G number of transceiver unit groups. The G number of transmission beam groups may include G number of transmission beam groups acquired by the receiving end device after dividing the Q number of transmission beams in accordance with the measurement results of the G number of transceiver unit groups.

In some possible embodiments of the present disclosure, the Q number of transmission beams may include Q number of transmission beams selected by the receiving end device in the N number of transmission beams and corresponding to Q number of measurement results with top Q reception quality levels in the measurement results of the G number of transceiver unit groups. The G number of transmission beam groups may include G number of transmission beam groups acquired by the receiving end device after dividing the Q number of transmission beams in accordance with the transceiver unit groups of the Q number of transmission beams corresponding to the Q number of measurement results.

In some possible embodiments of the present disclosure, the Q number of transmission beams may include Q number of transmission beams selected by the receiving end device in the N number of transmission beams and corresponding to Q number of measurement results acquired in accordance with $Q_g$ measurement results with top $Q_g$ reception quality levels in the measurement results of each transceiver unit group, where $Q_g$s for different transceiver unit groups are a same positive integer or different positive integers, and a sum of $Q_g$s corresponding to the G number of transmission beam groups is Q. The G number of transmission beam groups may include G number of transmission beam groups acquired by the receiving end device after dividing the $Q_g$ transmission beams corresponding to the $Q_g$ measurement results of each transceiver unit group into a transmission beam group corresponding to the transceiver unit group.

In some possible embodiments of the present disclosure, each transceiver unit group of the receiving end device may include at least one transceiver unit, and each transceiver unit may include at least one reception beam. The measurement results of the G number of transceiver unit groups may include measurement results of the G number of transceiver unit groups selected from measurement result sets of the G number of transceiver unit groups acquired by the receiving end device after receiving and measuring the beam training signal for each transmission beam in the N number of transmission beams using each reception beam for the G number of transceiver unit groups. The measurement result set of each transceiver unit group may include measurement results acquired by the receiving end device after receiving and measuring the beam training signals for the N number of transmission beams using each reception beam for the transceiver unit group. The measurement results of each transceiver unit group may include N measurement results, and the N measurement results include measurement results with best reception quality levels corresponding to each transmission beam in the measurement result sets of the transceiver unit group.

In some possible embodiments of the present disclosure, the processor 1300 is further configured to receive the identification information about the Q number of transmission beams in the N number of transmission beams as well as the group information and subgroup information about each transmission beam in the Q number of transmission beams from the receiving end device, and the transmission beams corresponding to a same reception beam in each transmission beam group may belong to one transmission beam subgroup. The processor 1300 is further configured to determine that a signal is capable of being transmitted simultaneously to the receiving end device via the transmission beams belonging to a same transmission beam subgroup in the Q number of transmission beams.

In some possible embodiments of the present disclosure, the reception beam corresponding to each transmission beam may include a reception beam corresponding to a measurement result with the best reception quality level acquired by the receiving end device in the measurement results of the beam training signals for the transmission beam using all candidate reception beams.

In some possible embodiments of the present disclosure, the processor 1300 is further configured to: receive group information about the G number of transmission beam groups from the receiving end device, the group information about each transmission beam group including transmission beam subgroup information about each transmission beam subgroup in the transmission beam group, and the transmission beam subgroup information including identification information about each transmission beam in the transmission beam subgroup; or receive beam division information about the Q number of transmission beams from the receiving end device, the beam division information about each transmission beam including identification information about the transmission beam, a group ID of the transmission beam group to which the transmission beam belongs, and a subgroup ID of the transmission beam subgroup to which the transmission beam belongs.

In some possible embodiments of the present disclosure, when the G number of transmission beam groups include a target transmission beam group, the target transmission beam group includes a target transmission beam. A reception beam corresponding to the target transmission beam is different from a reception beam corresponding to any of the other transmission beams in the target transmission beam group, and a subgroup ID of the target transmission beam is null or the target transmission beam has a predetermined subgroup ID.

It should be appreciated that, the implementation of the transmitting end device may refer to the implementation of the transmitting end device in FIGS. 1-5 with a same beneficial effect, and thus will not be particularly defined herein.

Figure 14:
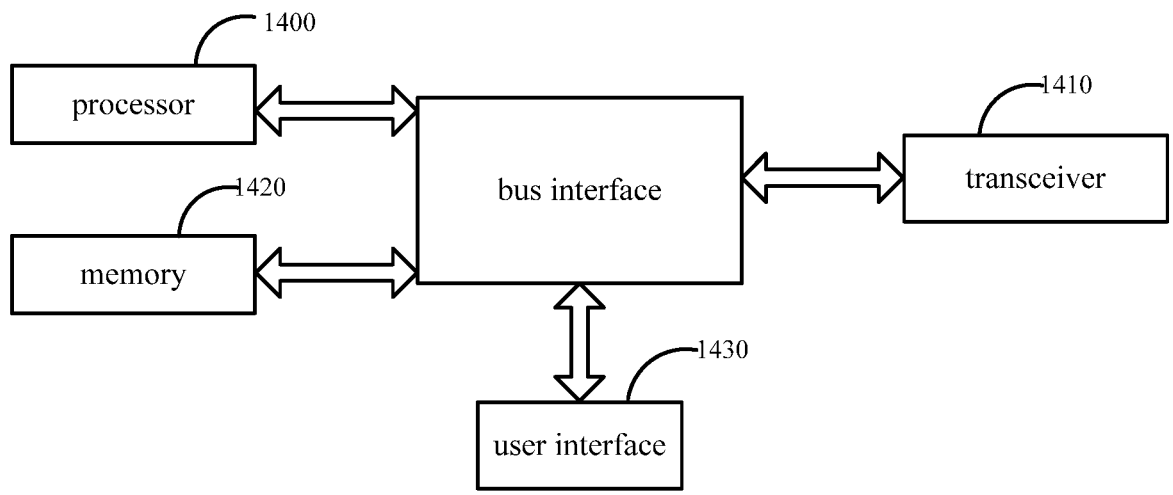
FIG. 14 is still yet another schematic view showing the receiving end device according to some embodiments of the present disclosure.

The present disclosure further provides in some embodiments a receiving end device which, as shown in FIG. 14, includes a processor 1400, a transceiver 1410, a memory 1420, a user interface 1430 and a bus interface. The processor 1400 is configured to read a program stored in the memory 1420, so as to: receive through the transceiver 1410 and measure beam training signals for N number of transmission beams from a transmitting end device, select Q number of transmission beams from the N number of transmission beams in accordance with a measurement result, and divide the Q number of transmission beams into G number of transmission beam groups, N, Q and G being each a positive integer; and transmit through the transceiver 1410 identification information about the Q number of transmission beams and group information about each transmission beam in the Q number of transmission beams to the transmitting end device, so as to enable the transmitting end device to determine that a signal is capable of being transmitted simultaneously to the receiving end device via transmission beams in the Q number of transmission beams belonging to different transmission beam groups. The transceiver 1410 is configured to receive and transmit data under the control of the processor 1400.

In FIG. 14, bus architecture may include a number of buses and bridges connected to each other, so as to connect various circuits for one or more processors 1400 and one or more memories 1420. In addition, as is known in the art, the bus architecture may be used to connect any other circuits, such as a circuit for a peripheral device, a circuit for a voltage stabilizer and a power management circuit. The bus interface may be provided, and the transceiver 1410 may consist of a plurality of elements, i.e., a transmitter and a receiver for communication with any other devices over a transmission medium. With respect to different UEs, the user interface 1430 may also be provided for devices which are to be arranged inside or outside the UE, and these devices may include but not limited to a keypad, a display, a speaker, a microphone and a joystick. The processor 1400 may take charge of managing the bus architecture as well as general processings. The memory 1420 may store therein data for the operation of the processor 1400.

In some possible embodiments of the present disclosure, the processor 1400 is further configured to receive and measure the beam training signals for the N number of transmission beams from the transmitting end device using G number of transceiver unit groups, and the G number of transmission beam groups may correspond to G number of transceiver unit groups of the receiving end device respectively.

In some possible embodiments of the present disclosure, the processor 1400 is further configured to: receive and measure the beam training signal for each transmission beam in the N number of transmission beams from the transmitting end device using the G number of transceiver unit groups to acquire measurement results of the G number of transceiver unit groups, the measurement result of each transceiver unit group including a measurement result acquired after the receiving end device has received and measured the beam training signals for the N number of transmission beams using the transceiver unit group; and select the Q number of transmission beams from the N number of transmission beams in accordance with the measurement results of the G number of transceiver unit groups, and divide the Q number of transmission beams into the G number of transmission beam groups.

In some possible embodiments of the present disclosure, the processor 1400 is further configured to select Q number of measurement results with top Q reception quality levels in the measurement results of the G number of transceiver unit groups, select the Q number of transmission beams corresponding to the Q number of measurement results in the N number of transmission beams, and divide the Q number of transmission beams into the G number of transmission beam groups in accordance with the transceiver unit groups of the Q number of transmission beams corresponding to the Q number of measurement results.

In some possible embodiments of the present disclosure, the processor 1400 is further configured to: select $Q_g$ measurement results with top $Q_g$ reception quality levels in the measurement results of each transceiver unit group to acquire Q number of measurement results, $Q_g$s for different transceiver unit groups being a same positive integer or different positive integers, and a sum of $Q_g$s corresponding to the G number of transmission beam groups being Q; and select the Q number of transmission beams corresponding to the Q number of measurement results from the N number of transmission beams, and divide the $Q_g$ transmission beams corresponding to the $Q_g$ measurement results of each transceiver unit group into a transmission beam group corresponding to the transceiver unit group.

In some possible embodiments of the present disclosure, each transceiver unit group of the receiving end device may include at least one transceiver unit, and each transceiver unit may include at least one reception beam. The processor 1400 is further configured to: receive and measure the beam training signal for each transmission beam of the N number of transmission beams from the transmitting end device using each reception beam for the G number of transceiver unit group to acquire measurement result sets of the G number of transceiver unit groups, the measurement result set of each transceiver unit group including measurement results acquired by the receiving end device after receiving and measuring the beam training signals for the N number of transmission beams using each reception beam for the transceiver unit group; and select the measurement results of the G number of transceiver unit groups from the measurement result set of the G number of transceiver unit groups, the measurement results of each transceiver unit group including N measurement results, and the N measurement results including measurement results with best reception quality levels corresponding to each transmission beam in the measurement result sets of the transceiver unit group.

In some possible embodiments of the present disclosure, the processor 1400 is further configured to: select one reception beam for each of the Q number of transmission beams from candidate reception beams for the receiving end device; and divide transmission beams in each transmission beam group corresponding to a same reception beam into one transmission beam subgroup. The processor 1400 is further configured to transmit the identification information about the Q number of transmission beams in the N number of transmission beams as well as the group information and subgroup information about each transmission beam in the Q number of transmission beams to the transmitting end device.

In some possible embodiments of the present disclosure, the processor 1400 is further configured to acquire measurement results of the beam training signal for each transmission beam using all the candidate reception beams for the receiving end device, and select a reception beam corresponding to a measurement result with a best reception quality level in the acquired measurement results as the reception beam for the transmission beam.

In some possible embodiments of the present disclosure, the processor 1400 is further configured to: transmit group information about the G number of transmission beam groups to the transmitting end device, the group information about each transmission beam group including transmission beam subgroup information about each transmission beam subgroup in the transmission beam group, and the transmission beam subgroup information including the identification information about each transmission beam in the transmission beam subgroup; or transmit beam division information about the Q number of transmission beams to the transmitting end device, the beam division information about each transmission beam including identification information about the transmission beam, a group ID of the transmission beam group to which the transmission beam belongs, and a subgroup ID of the transmission beam subgroup to which the transmission beam belongs.

In some possible embodiments of the present disclosure, when the G number of transmission beam groups may include a target transmission beam group, the target transmission beam group may include a target transmission beam. A reception beam corresponding to the target transmission beam may be different from a reception beam corresponding to any of the other transmission beams in the target transmission beam group, and a subgroup ID of the target transmission beam may be null or the target transmission beam may have a predetermined subgroup ID.

It should be appreciated that, the implementation of the receiving end device may refer to the implementation of the receiving end device in FIGS. 1-5 with a same beneficial effect, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission beam determination method, comprising:
    transmitting, by a transmitting end device, beam training signals for N number of transmission beams to a receiving end device, N being a positive integer;
    receiving, by the transmitting end device, identification information about Q number of transmission beams in the N number of transmission beams and group information about each transmission beam in the Q number of transmission beams from the receiving end device, the Q number of transmission beams comprising G number of transmission beam groups, the G number of transmission beam groups being acquired by the receiving end device in accordance with a measurement result, the measurement result being a measurement result acquired after the receiving end device has received and measured the beam training signals from the transmitting end device, Q and G being each a positive integer; and
    determining, by the transmitting end device, that a signal is capable of being transmitted simultaneously to the receiving end device via transmission beams in the Q number of transmission beams belonging to different transmission beam groups,
    wherein the receiving, by the transmitting end device, the identification information about the Q number of transmission beams in the N number of transmission beams and the group information about each transmission beam in the Q number of transmission beams from the receiving end device comprises:
    receiving, by the transmitting end device, the identification information about the Q number of transmission beams in the N number of transmission beams as well as the group information and subgroup information about each transmission beam in the Q number of transmission beams from the receiving end device, and the transmission beams corresponding to a same reception beam in each transmission beam group belong to one transmission beam subgroup,
    wherein the transmission beam determination method further comprises determining, by the transmitting end device, that a signal is capable of being transmitted simultaneously to the receiving end device via the transmission beams belonging to a same transmission beam subgroup in the Q number of transmission beams.

2. The transmission beam determination method according to claim 1, wherein the G number of transmission beam groups correspond to G number of transceiver unit groups of the receiving end device respectively.

3. The transmission beam determination method according to claim 2, wherein the measurement results comprise measurement results of the G number of transceiver unit groups acquired after the receiving end device has received and measured the beam training signal for each transmission beam in the N number of transmission beams using the G number of transceiver unit groups, and the measurement result of each transceiver unit group comprises a measurement result acquired after the receiving end device has received and measured the beam training signals for the N number of transmission beams using the transceiver unit group;
the Q number of transmission beams comprise Q number of transmission beams selected by the receiving end device from the N number of transmission beams in accordance with the measurement results of the G number of transceiver unit groups; and
the G number of transmission beam groups comprise G number of transmission beam groups acquired by the receiving end device after dividing the Q number of transmission beams in accordance with the measurement results of the G number of transceiver unit groups.

4. The transmission beam determination method according to claim 1, wherein the receiving, by the transmitting end device, the identification information about the Q number of transmission beams in the N number of transmission beams as well as the group information and the subgroup information about each transmission beam in the Q number of transmission beams from the receiving end device comprises:
receiving, by the transmitting end device, group information about the G number of transmission beam groups from the receiving end device, the group information about each transmission beam group comprising transmission beam subgroup information about each transmission beam subgroup in the transmission beam group, and the transmission beam subgroup information comprising identification information about each transmission beam in the transmission beam subgroup; or
receiving, by the transmitting end device, beam division information about the Q number of transmission beams from the receiving end device, the beam division information about each transmission beam comprising identification information about the transmission beam, a group identity (ID) of the transmission beam group to which the transmission beam belongs, and a subgroup ID of the transmission beam subgroup to which the transmission beam belongs.

5. The transmission beam determination method according to claim 4, wherein when the G number of transmission beam groups comprise a target transmission beam group, the target transmission beam group comprises a target transmission beam, wherein a reception beam corresponding to the target transmission beam is different from a reception beam corresponding to any of the other transmission beams in the target transmission beam group, and a subgroup ID of the target transmission beam is null or the target transmission beam has a predetermined subgroup ID.

6. A transmission beam determination method, comprising:
receiving and measuring, by a receiving end device, beam training signals for N number of transmission beams from a transmitting end device, selecting Q number of transmission beams from the N number of transmission beams in accordance with a measurement result, and dividing the Q number of transmission beams into G number of transmission beam groups, N, Q and G being each a positive integer; and
transmitting, by the receiving end device, identification information about the Q number of transmission beams and group information about each transmission beam in the Q number of transmission beams to the transmitting end device, so as to enable the transmitting end device to determine that a signal is capable of being transmitted simultaneously to the receiving end device via transmission beams in the Q number of transmission beams belonging to different transmission beam groups,
wherein the method further comprises:
selecting, by the receiving end device, one reception beam for each of the Q number of transmission beams from candidate reception beams for the receiving end device; and
dividing, by the receiving end device, transmission beams in each transmission beam group corresponding to a same reception beam into one transmission beam subgroup,
wherein the transmitting, by the receiving end device, the identification information about the Q number of transmission beams in the N number of transmission beams and subgroup information about each transmission beam in the Q number of transmission beams to the transmitting end device comprises:
transmitting, by the receiving end device, the identification information about the Q number of transmission beams in the N number of transmission beams as well as the group information and the subgroup information about each transmission beam in the Q number of transmission beams to the transmitting end device.

7. The transmission beam determination method according to claim 6, wherein the receiving and measuring, by the receiving end device, the beam training signals for the N number of transmission beams from the transmitting end device comprises:
receiving and measuring, by the receiving end device, the beam training signals for the N number of transmission beams from the transmitting end device using G number of transceiver unit groups, and the G number of transmission beam groups correspond to G number of transceiver unit groups of the receiving end device respectively.

8. The transmission beam determination method according to claim 7, wherein the receiving and measuring, by the receiving end device, the beam training signals for the N number of transmission beams from the transmitting end device, selecting the Q number of transmission beams from the N number of transmission beams in accordance with the measurement result, and dividing the Q number of transmission beams into the G number of transmission beam groups comprises:
receiving and measuring, by the receiving end device, the beam training signal for each transmission beam in the N number of transmission beams from the transmitting end device using the G number of transceiver unit groups to acquire measurement results of the G number of transceiver unit groups, the measurement result of each transceiver unit group comprising a measurement result acquired after the receiving end device has received and measured the beam training signals for the N number of transmission beams using the transceiver unit group; and selecting, by the receiving end device, the Q number of transmission beams from the N number of transmission beams in accordance with the measurement results of the G number of transceiver unit groups, and dividing the Q number of transmission beams into the G number of transmission beam groups.

9. The transmission beam determination method according to claim 8, wherein the selecting, by the receiving end device, the Q number of transmission beams from the N number of transmission beams in accordance with the measurement results of the G number of transceiver unit groups, and dividing the Q number of transmission beams into the G number of transmission beam groups comprises:

selecting, by the receiving end device, Q number of measurement results with top Q reception quality levels in the measurement results of the G number of transceiver unit groups, selecting the Q number of transmission beams corresponding to the Q number of measurement results in the N number of transmission beams, and dividing the Q number of transmission beams into the G number of transmission beam groups in accordance with the transceiver unit groups of the Q number of transmission beams corresponding to the Q number of measurement results.

10. The transmission beam determination method according to claim 8, wherein the selecting, by the receiving end device, the Q number of transmission beams from the N number of transmission beams in accordance with the measurement results of the G number of transceiver unit groups and dividing the Q number of transmission beams into the G number of transmission beam groups comprises:

selecting, by the receiving end device, $Q_g$ measurement results with top $Q_g$ reception quality levels in the measurement results of each transceiver unit group to acquire Q number of measurement results, $Q_g$s for different transceiver unit groups being a same positive integer or different positive integers, and a sum of $Q_g$s corresponding to the G number of transmission beam groups being Q; and selecting, by the receiving end device, the Q number of transmission beams corresponding to the Q number of measurement results from the N number of transmission beams, and dividing the $Q_g$ transmission beams corresponding to the $Q_g$ measurement results of each transceiver unit group into a transmission beam group corresponding to the transceiver unit group.

11. The transmission beam determination method according to claim 8, wherein each transceiver unit group of the receiving end device comprises at least one transceiver unit, and each transceiver unit comprises at least one reception beam, wherein the receiving and measuring, by the receiving end device, the beam training signal for each transmission beam of the N number of transmission beams from the transmission end using the G number of transceiver unit groups to acquire the measurement results of the G number of transceiver unit groups comprises:

receiving and measuring, by the receiving end device, the beam training signal for each transmission beam of the N number of transmission beams from the transmitting end device using each reception beam for the G number of transceiver unit group to acquire measurement result sets of the G number of transceiver unit groups, the measurement result set of each transceiver unit group comprising measurement results acquired by the receiving end device after receiving and measuring the beam training signals for the N number of transmission beams using each reception beam for the transceiver unit group; and selecting, by the receiving end device, the measurement results of the G number of transceiver unit groups from the measurement result set of the G number of transceiver unit groups, the measurement results of each transceiver unit group comprising N measurement results, and the N measurement results comprising measurement results with best reception quality levels corresponding to each transmission beam in the measurement result sets of the transceiver unit group.

12. The transmission beam determination method according to claim 6, wherein the selecting, by the receiving end device, one reception beam for each of the Q number of transmission beams in the candidate reception beams for the receiving end device comprises:

acquiring, by the receiving end device, measurement results of the beam training signal for each transmission beam using all the candidate reception beams for the receiving end device, and selecting a reception beam corresponding to a measurement result with a best reception quality level in the acquired measurement results as the reception beam for the transmission beam.

13. The transmission beam determination method according to claim 6, wherein the transmitting, by the receiving end device, the identification information about the Q number of transmission beams in the N number of transmission beams as well as the group information and subgroup information about each transmission beam in the Q number of transmission beams to the transmitting end device comprises:

transmitting, by the receiving end device, group information about the G number of transmission beam groups to the transmitting end device, the group information about each transmission beam group comprising transmission beam subgroup information about each transmission beam subgroup in the transmission beam group, and the transmission beam subgroup information comprising the identification information about each transmission beam in the transmission beam subgroup; or transmitting, by the receiving end device, beam division information about the Q number of transmission beams to the transmitting end device, the beam division information about each transmission beam comprising identification information about the transmission beam, a group ID of the transmission beam group to which the transmission beam belongs, and a subgroup ID of the transmission beam subgroup to which the transmission beam belongs.

14. The transmission beam determination method according to claim 13, wherein when the G number of transmission beam groups comprise a target transmission beam group, the target transmission beam group comprises a target transmission beam, wherein a reception beam corresponding to the target transmission beam is different from a reception beam corresponding to any of the other transmission beams in the target transmission beam group, and a subgroup ID of the target transmission beam is null or the target transmission beam has a predetermined subgroup ID.

15. A transmitting end device, comprising a processor, a transceiver, a memory, a user interface and a bus interface, wherein the processor is configured to read a program stored in the memory, so as to implement the transmission beam determination method according to claim 1.

16. A receiving end device, comprising a processor, a transceiver, a memory, a user interface and a bus interface, wherein the processor is configured to read a program stored in the memory, so as to implement the transmission beam determination method according to claim 6.

17. A non-transitory computer-readable storage medium storing therein a computer program, wherein the computer program is executed by a processor so as to implement the transmission beam determination method according to claim 1.

18. A non-transitory computer-readable storage medium storing therein a computer program, wherein the computer program is executed by a processor so as to implement the transmission beam determination method according to claim 6.

\* \* \* \* \*